(12) United States Patent
Weilenmann

(10) Patent No.: US 7,643,955 B2
(45) Date of Patent: Jan. 5, 2010

(54) MULTI-TARGETING METHOD FOR MEASURING DISTANCE ACCORDING TO THE PHASE MEASURING PRINCIPLE

(75) Inventor: Jurg Weilenmann, Widnau (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 12/064,197

(22) PCT Filed: Aug. 18, 2006

(86) PCT No.: PCT/EP2006/008184

§ 371 (c)(1),
(2), (4) Date: Feb. 19, 2008

(87) PCT Pub. No.: WO2007/022927

PCT Pub. Date: Mar. 1, 2007

(65) Prior Publication Data

US 2008/0243430 A1 Oct. 2, 2008

(30) Foreign Application Priority Data

Aug. 24, 2005 (EP) .................................. 05107764

(51) Int. Cl.
*G01C 25/00* (2006.01)
(52) U.S. Cl. ........................................ 702/97
(58) Field of Classification Search ............... 702/97, 702/85; 356/4.01, 5.01, 5.11, 5.15; 342/126, 342/463
See application file for complete search history.

(56) References Cited

U.S. PATENT DOCUMENTS

| | | | | |
|---|---|---|---|---|
| 5,138,322 A | * | 8/1992 | Nuttall | 342/126 |
| 5,204,732 A | * | 4/1993 | Ohmamyuda et al. | 356/5.11 |
| 5,563,701 A | * | 10/1996 | Cho | 356/5.15 |
| 6,040,898 A | * | 3/2000 | Mrosik et al. | 356/5.09 |
| 6,509,958 B2 | * | 1/2003 | Pierenkemper | 356/5.01 |
| 6,906,302 B2 | * | 6/2005 | Drowley | 250/208.1 |
| 7,202,941 B2 | * | 4/2007 | Munro | 356/5.01 |
| 2003/0164936 A1 | * | 9/2003 | Mehr et al. | 356/4.01 |
| 2004/0107063 A1 | * | 6/2004 | Weilenmann | 702/85 |
| 2005/0151956 A1 | * | 7/2005 | Chien et al. | 356/5.11 |
| 2006/0114146 A1 | * | 6/2006 | Lindenmeier et al. | 342/125 |

FOREIGN PATENT DOCUMENTS

| | | | |
|---|---|---|---|
| DE | 10348104 | | 2/2008 |
| EP | 1450128 | | 8/2004 |
| JP | 09054156 A | * | 2/1997 |
| JP | 2006266772 A | * | 10/2006 |
| JP | 2007024715 A | * | 2/2007 |

* cited by examiner

*Primary Examiner*—Tung S Lau
*Assistant Examiner*—Xiuquin Sun
(74) *Attorney, Agent, or Firm*—Workman Nydegger

(57) ABSTRACT

Distances to targets ($2a$, $2b$) are simultaneously determined in a method for measuring distance according to the phase measuring principle with a time discrete emission of periodic signals (7) and a sampling of received signals for generating and optionally storing sampled values, whereby the signals have signal portions that are reflected by the targets ($2a$, $2b$) and superimposed. A statistical parameter estimation problem based on a mathematical signal model is solved in such a manner that the number of the targets ($2a$, $2b$) for more than one target ($2a$, $2b$) is preset or fundamentally, the number of targets is determined by the method, and the inequalities $D^- \leq D^k < D^+$ and $1 \leq k \leq K$ are valid. The preset distances $D^- \in IR$ and $D^+ \in IR$ with $D^- < D^+$ set the measuring range of the distance measuring device.

20 Claims, 2 Drawing Sheets

MULTI-TARGETING METHOD FOR MEASURING DISTANCE ACCORDING TO THE PHASE MEASURING PRINCIPLE

BACKGROUND

The invention relates to a multi-targeting method for measuring distance according to the phase measuring principle and a computer program product.

In the area of non contact distance measurement, various measuring principles and measuring methods are known, which are described, for example, in the text books "J. M. Rüeger: Electronic Distance Measurement, $4^{th}$ Edition; Springer, Berlin, 1996" and "R. Joeckel & M. Stober: Elektronische Entfernungs—und Richtungsmessung [Electronic distance and direction measurement] $4^{th}$ Edition; 4. Auflage; Verlag Konrad Wittwer, Stuttgart, 1999". Commercially available electrooptical distance measuring devices operate chiefly according to the phase measuring principle or the pulse transit time measurement principle; cf. for example Joeckel & Stober, chapter 13.

The mode of operation of these devices consists in transmitting modulated electromagnetic radiation, for example intensity-modulated light, to the targets to be surveyed and then receiving one or more echoes from the back-scattering objects, which are ideally exclusively the targets to be surveyed. The signal evaluation of the received echo is a standard technical task for which a multiplicity of solutions, in particular with the use of optical systems, was realised. In geodesy and the construction industry, tacheometers which are equipped with rangefinders measuring without reflectors have increasingly become established in recent years.

Distance measurement without reflectors often leads to situations in which the measured beam emitted by the rangefinder simultaneously impinges on a plurality of objects. This happens, for example, during the surveying of an edge; if it is measured, a part of the beam strikes the object with the edge while another part of the beam illuminates an object behind or the floor. A further example is a retroreflector which is present in the vicinity of a weakly reflecting target object and passes scattered light into the receiver of the rangefinder. A similar situation occurs if, unintentionally and often also unnoticed, the beam impinges on objects between the actual object to be measured and the instrument, for example in the case of distance measurements through window panes, tree branches, wire fences or wire grids.

In such multi-targeting situations, a conventional phase meter which outputs a single distance generally gives a false measurement, i.e. a measured distance value which contains an error which is far outside the specified accuracy of measurement. Transit-time meters can more easily recognise and handle multi-targeting situations provided that the targets are so far apart and the transmitted pulses are of a sufficiently short time that the echoes thereof can be detected and kept apart. In addition, transit-time meters have a larger range since their pulses can have a higher intensity than the continuously transmitted signals of the phase meters, without infringing eye safety regulations.

In spite of these two advantages of transit time meters, most customary tacheometers are equipped with phase meters because only in this way can they achieve the required accuracy of distance measurement in the mm or even sub-mm range with an effort suitable for field applications. The reliability of these devices would be substantially increased if their phase meters were to have multi-targeting capabilities.

WO 2004/074773 or EP 1 450 128 discloses a hybrid system for deriving geodetic distance information, in which a light signal is transmitted to one or more targets. Device components, such as transmitter and receiver, together with the targets are modelled as a linear time-invariant system which is activated by a signal and the system response of which is recorded. In contrast to pure transit time or phase meters, the distance information is derived both from the displacement as a function of time and from the signal shape of the system response.

Thus, the multi-targeting for phase meters which has not been technically realised or has been only with considerable complexity in hybrid systems proves to be a substantial disadvantage of all distance measuring principles known to date, once again only phase meters providing, with acceptable effort, the accuracy required for many applications. A main reason for this situation is the view, widespread among those skilled in the art and explicitly expressed, for example, in EP 1 450 128, that pure or exclusive phase meters, i.e. those which use no time signals, do not in principle have multi-targeting capabilities.

SUMMARY OF THE INVENTION

The object of the present invention is therefore the provision of a simplified measuring method which is suitable for field use, has high accuracy and has multi-targeting capabilities.

A further object of the present invention is the provision of a pure phase measuring method which has inherent multi-targeting capabilities.

According to the invention, the signals received by the phase meter can be processed so that distance measurements to a plurality of targets are possible simultaneously with the high accuracy characteristic of phase meters, it being possible for the number of these targets to be known from the outset or to be unknown. In the latter case, it is also the object of the signal processing to determine the number of simultaneously surveyed targets or, if appropriate, to negate the presence of a surveyable target.

The present invention relates to a mathematical algorithmic method for simultaneous measurement of the distances to a plurality of spatially separated targets by means of a phase meter, it being possible for the latter to be designed by way of example as an electrooptical phase meter. A simple example of such a multi-targeting situation is the distance measurement to a house wall through a window pane, the distances to the house wall and to the window pane being simultaneously measured.

The prejudice of those skilled in the art that pure phase meters do not have multi-targeting capability is promoted in that the technical literature, including that already cited, represents the phase measuring principles in relation to a single target and generally by means of sinusoidal measuring signals and is thus strongly based on the view.

According to the invention, formal access to the problem via a mathematical signal model which links the digital signal data generated by the phase meter quantitatively to the unknown target distances is therefore chosen. The design of this signal model is not driven by the view but by the logical requirements which arise from the desire to be able to determine the target distances from the signal data unambiguously and with an acceptable computational effort. The unknown target distances are interpreted as parameters of this signal model which—together with all other unknown model parameters—are to be estimated "optimally" from the signal data. The measuring task at issue is therefore formulated and solved as a statistical parameter estimation problem.

Below, the signal model on which the signal processing is based is formulated, explained and continuously supplemented or further specified. In relation to this model, the distance measuring task is formulated as a maximum likelihood parameter estimation problem and, according to the invention, this is reduced to a maximisation problem in such a way that the solution thereof also comprises in particular online signal identification. This nonlinear and non-concave maximisation problem can be solved efficiently according to the invention by a numerical method.

The formulation, explanation and further processing of the signal model requires standard notation and standard terminology of the mathematics used and in particular of numerical linear algebra, as used, for example in the standard work "G. H. Golub & C. F. Van Loan: Matrix Computations, 3$^{rd}$ Edition; The Johns Hopkins University Press, Baltimore, 1996". The mathematical symbols used in this patent and the associated terminology are explained below.

The symbol $\in$ represents the set theory relation "is an element of". In general, the sets are as follows:

$\mathbb{Z}$ set of integral numbers $\{\ldots, -2, -1, 0, 1, 2, \ldots\}$,
$\mathbb{N}_0 := \{n \in \mathbb{Z} | n \geq 0\}$ set of non-negative integral numbers,
$\mathbb{N} := \{n \in \mathbb{Z} | n > 0\}$ set of natural numbers, $$\mathbb{Q} := \left\{ \frac{m}{n} \,\middle|\, m \in \mathbb{Z} \ \& \ n \in \mathbb{N} \right\}$$

set of rational numbers, $\mathbb{R}$ set of real numbers,
$\mathbb{R}_+ := \{x \in \mathbb{R} | x \geq 0\}$ set of non-negative real numbers,
$\mathbb{R}_{++} := \{x \in \mathbb{R} | x > 0\}$ set of positive real numbers,
$\mathbb{C} := \{x + i \cdot y | x, y \in \mathbb{C}\}$ set of complex numbers with imaginary unit $i$, $i^2 = -1$, in which the arithmetic operations $+$, $-$, $\cdot$, $/$ and $-$ except in $\mathbb{C}$ / —the ordering relations $<$, $\leq$ are defined in the usual way.

For $a, b \in \mathbb{R}$,
$]a,b[ := \{x \in \mathbb{R} | a < x < b\}$ designates the open interval with left edge $a$ and right edge $b$,
$]a,b] := \{x \in \mathbb{R} | a < x \leq b\}$ designates the left half-open interval with left edge $a$ and right edge $b$,
$[a,b[ := \{x \in \mathbb{R} | a \leq x < b\}$ designates the right half-open interval with left edge $a$ and right edge $b$,
$[a,b] := \{x \in \mathbb{R} | a \leq x \leq b\}$ designates the closed interval with left edge $a$ and right edge $b$.

For $x \in \mathbb{R}$, $\lceil x \rceil := \min\{n \in \mathbb{Z} | n \geq x\} \in \mathbb{Z}$, $\lfloor x \rfloor := \max\{n \in \mathbb{Z} | n \leq x\} \in \mathbb{Z}$, and $$\langle x \rangle \in \left[ -\frac{1}{2}, \frac{1}{2} \right[$$

is the (only) real number for which $rd(x) := x - \langle x \rangle \in \mathbb{Z}$. For $z = x + i \cdot y \in \mathbb{C}$, $\bar{z} := x - i \cdot y \in \mathbb{C}$ designates the number which is the conjugate complex of $z$, $$\operatorname{Re}\{z\} := x = \frac{z + \bar{z}}{2} \in \mathbb{R}$$

designates the real part of $z$, $$\operatorname{Im}\{z\} := y = \frac{z - \bar{z}}{2 \cdot i} \in \mathbb{R}$$

designates the imaginary part of $z$, $|z| := \sqrt{\bar{z} \cdot z} = \sqrt{x^2 + y^2} \in \mathbb{R}_+$ designates the magnitude of $z$ and $\arg(z)$ designates the argument of $z$, i.e. the real number $\arg(z) \in [-\pi, \pi[$ (determined uniquely in the case $z \neq 0$) for which $z = |z| \cdot e^{i \cdot \arg(z)}$.

For the set $\mathbb{M}$ and $m, n \in \mathbb{N}$, $\mathbb{M}^{m \times n}$ designates the set of $m \times n$ matrices $$M := \begin{bmatrix} \mu_1^1 & \cdots & \mu_n^1 \\ \vdots & \ddots & \vdots \\ \mu_1^m & \cdots & \mu_n^m \end{bmatrix}$$

with $\mu_j^i \in \mathbb{M}$, $1 \leq i \leq m$ $1 \leq j \leq n$.

For $M \in \mathbb{M}^{m \times n}$, $$M^T := \begin{bmatrix} \mu_1^1 & \cdots & \mu_1^m \\ \vdots & \ddots & \vdots \\ \mu_n^1 & \cdots & \mu_n^m \end{bmatrix} \in \mathbb{M}^{n \times m}$$

designates the matrix transposed to $M \in \mathbb{M}^{m \times n}$. If $M \in \mathbb{M}^{m \times m}$ satisfies the equation $M^T = M$, then $M$ is called symmetrical; if $M \in \mathbb{M}^{m \times m}$ has identical elements along each of its diagonals, then $M$ is called a Toeplitz matrix; and if the Toeplitz matrix $M \in \mathbb{M}^{m \times m}$ has the special form $$M = \begin{bmatrix} \mu^1 & \mu^m & \cdots & \mu^2 \\ \mu^2 & \mu^1 & \ddots & \vdots \\ \vdots & \ddots & \ddots & \mu^m \\ \mu^m & \cdots & \mu^2 & \mu^1 \end{bmatrix},$$

then $M$ is called a circulant matrix. For a function $\Phi: \mathbb{M} \to \mathbb{M}'$, $$\Phi(M) := \begin{bmatrix} \Phi(\mu_1^1) & \cdots & \Phi(\mu_n^1) \\ \vdots & \ddots & \vdots \\ \Phi(\mu_1^m) & \cdots & \Phi(\mu_n^m) \end{bmatrix} \in \mathbb{M}'^{m \times n},$$

$M \in \mathbb{M}^{m \times n}$; in particular $\Phi(M^T) = [\Phi(M)]^T$. If $<$ is a binary relation defined in $\mathbb{M}$ and $M, M' \in \mathbb{M}^{m \times n}$, then $M < M'$ is equivalent to $\mu_j^i < \mu'^i_j$ for all $1 \leq i \leq m$ & $1 \leq j \leq n$. $\mathbb{M}^m$ is written instead as $\mathbb{M}^{m \times 1}$; $\mathbb{M}^m$ therefore designates the set of (column) vectors T $$\mu := \begin{bmatrix} \mu^1 \\ \vdots \\ \mu^m \end{bmatrix} \in \mathbb{M}^m$$

with $\mu^i \in \mathbb{M}$ for $1 \leq i \leq m$. For $M \in \mathbb{M}^{m \times n}$, $i \in \{1, \ldots, m\}$, $j \in \{1, \ldots, n\}$, $M(i,:) \in \mathbb{M}^{\times n}$ or $M(:,j) \in \mathbb{M}^m$ denotes the i th row vector or j th column vector of M, and $$M(:) := \begin{bmatrix} M(:,1) \\ \vdots \\ M(:,n) \end{bmatrix} \in \mathbb{M}^{m \cdot n}$$

designates the vector which forms as a result of writing the column vectors of $M \in \mathbb{M}^{m \times n}$ one under the other. For $M \in \mathbb{M}^{m \times n}$ and $M' \in \mathbb{M}^{m \times n'}$, $[M,M'] \in \mathbb{M}^{m \times (n+n')}$ designates the matrix with $[M,M'](:,j)=M(:,j)$ for $1 \leq j \leq n$ and with $[M,M'](:,j)=M'(:,j-n)$ for $n<j \leq n+n'$; analogously, $M \in \mathbb{M}^{m \times n}$ and $M' \in \mathbb{M}^{m' \times n}$ give rise to the matrix $$\begin{bmatrix} M \\ M' \end{bmatrix} \in \mathbb{M}^{(m+m') \times n} : \begin{bmatrix} M \\ M' \end{bmatrix} := [M^T, M'^T]^T.$$

For $W \in \mathbb{C}^{l \times m}$ and $Z \in \mathbb{C}^{m \times n}$, $W \cdot Z \in \mathbb{C}^{l \times n}$ designates the usual matrix product of W and Z, and $Z^H := \overline{Z}^T \in \mathbb{C}^{n \times m}$ is the matrix adjoint to Z. For $W, Z \in \mathbb{C}^{m \times n}$, $W \circ Z \in \mathbb{C}^{m \times n}$ designates the Hadamard product or elementwise product and $W \div Z \in \mathbb{C}^{m \times n}$ designates the elementwise quotients $([W \circ Z]_j^i := [W]_j^i \cdot [Z]_j^i$ and $$[W \div Z]_j^i := \frac{[W]_j^i}{[Z]_j^i}, \quad \begin{matrix} 1 \leq i \leq m \\ 1 \leq j \leq n \end{matrix}$$

of the matrices W and Z, the latter only being defined if Z contains no matrix element 0. Finally, for $W \in \mathbb{C}^{k \times l}$ and $Z \in \mathbb{C}^{m \times n}$, $$W \otimes Z := \begin{bmatrix} w_1^1 \cdot Z & \ldots & w_l^1 \cdot Z \\ \vdots & & \vdots \\ w_1^k \cdot Z & \ldots & w_l^k \cdot Z \end{bmatrix} \in \mathbb{C}^{k \cdot m \times l \cdot n}$$

designates the Kronecker product of W and Z. For $$z := \begin{bmatrix} z^1 \\ \vdots \\ z^m \end{bmatrix} \in \mathbb{C}^m, \text{Diag}(z) := \begin{bmatrix} z^1 & 0 & 0 \\ 0 & \ddots & 0 \\ 0 & 0 & z^m \end{bmatrix} \in \mathbb{C}^{m \times m}$$

is the diagonal matrix with diagonal z and all other elements 0.

In particular, $\mathbb{R}^m$ designates the m-dimensional Euclidean vector space with the scalar product $$x^T \cdot y = \sum_{i=1}^{m} x^i \cdot y^i \in \mathbb{R}$$

for $x, y \in \mathbb{R}^m$, and $\mathbb{C}^m$ designates the m-dimensional unitary vector space with the scalar product $$w^H \cdot z = \sum_{i=1}^{m} \overline{w}^i \cdot z^i \in \mathbb{C}$$

for $w, z \in \mathbb{C}^m$; for $x \in \mathbb{R}^m$ or $z \in \mathbb{C}^m$, $\|x\|_2 := \sqrt{x^T \cdot x} \in \mathbb{R}_+$ or $\|z\|_2 := \sqrt{z^H \cdot z} \in \mathbb{R}_+$ designates the Euclidean or unitary vector norm in $\mathbb{R}^m$ or $\mathbb{C}^m$. The vector $$0_m := \begin{bmatrix} 0 \\ \vdots \\ 0 \end{bmatrix} \in \mathbb{N}_0^m \text{ or } 1_m := \begin{bmatrix} 1 \\ \vdots \\ 1 \end{bmatrix} \in \mathbb{N}^m$$

with all components zero or 1 is referred to as zero vector or unit vector, respectively. The matrix $O_{m \times n} \in \mathbb{N}_0^{m \times n}$ with all components of 0 is referred to as m×n zero matrix and the matrix $I_m \in \mathbb{N}^{m \times m}$ with diagonal elements 1 and all other elements 0 is referred to as m×m identity matrix.

For $Z \in \mathbb{K}^{m \times n}$ ($\mathbb{K}=\mathbb{R}$ or $\mathbb{K}=\mathbb{C}$), $R(Z) := \{w \in \mathbb{K}^m | w = Z \cdot z, z \in \mathbb{K}^n\} \subset \mathbb{K}^m$ designates the value range of Z, $Z^+ \in \mathbb{K}^{n \times m}$ designates the Moore-Penrose pseudo-inverse of Z, as explained, for example, in §III.1.1 of the book "G. W. Stewart & J-G. Sun: Matrix Perturbation Theory; Academic Press, Inc., Boston, 1990", and $P_Z = Z \cdot Z^+ \in \mathbb{K}^{m \times m}$ and $P_Z^{\perp} = I_m - P_Z \in \mathbb{K}^{m \times n}$ designate the orthogonal projections of $\mathbb{K}^m$ onto $R(Z) \subset \mathbb{K}^m$ or onto the orthogonal complement $[R(Z)]^{\perp} \subset \mathbb{K}^m$ of $R(Z)$ in $\mathbb{K}^m$, as explained, for example, in §III.1.2 of the above-mentioned book. For $Z \in \mathbb{K}^{m \times n}$, $\text{Rank}(Z) \in \mathbb{N}$, designates the rank of Z, i.e. the dimension of the subspace $R(Z) \subset \mathbb{K}^m$. If $Z \in \mathbb{K}^{m \times m}$ has the full rank m, then Z is invertible and $Z^+=Z^{-1}$ is true for its inverse $Z^{-1}$.

The expected value of the random matrix $Z \in \mathbb{K}^{m \times n}$ ($\mathbb{K}=\mathbb{R}$ or $\mathbb{K}=\mathbb{C}$) is designated by $\mathbb{E}[Z] \in \mathbb{K}^{m \times n}$.

The physical relationships of the signal reception of a phase meter are mathematically modelled below.

The $K \in \mathbb{N}$ targets to be surveyed simultaneously, where K may be known or unknown, at different unknown distances $D^1, D^2, \ldots, D^K \in \mathbb{R}$ from the transmitter/receiver are irradiated sequentially, based on time, with $N \in \mathbb{N}$ periodic signals of known half-wavelengths $$\Lambda^1 > \Lambda^2 > \ldots > \Lambda^N > 0 \qquad (1-0)$$

which may be intensity-modulated light or infrared waves, microwaves, sound waves or ultrasonic waves or waves of other types.

The n th signal effected by some or all K targets is detected by the receiver located constructionally closest or directly adjacent to the transmitter, electrically converted, filtered and sampled equitemporally for $I'' \in \mathbb{N}$ periods, $M \in \mathbb{N}$ times per period, it being possible to average the $I''$ digital sampling values lying one period apart each to give the digital distance signal data $s_n^m \in \mathbb{R}$, $1 \leq m \leq M$, $1 \leq n \leq N$.

For stationary targets whose positions, attitudes, shapes and reflective properties with respective to the transmitter/receiver do not change during the measurement, the equations $$s_n^m = a^n + \sum_{k=1}^{K} A_n^k \cdot \sum_n \Sigma \left( \frac{D^k}{\Lambda^n} + y^n + \frac{m-1}{M} \right) + w_n^m, \quad (1\text{-}1)$$

$$1 \leq m \leq M$$
$$1 \leq n \leq N,$$

constitute an expedient mathematical model of the distance signal data $s_n^m$, where the symbols occurring (1-1) and not yet explained have the following meaning:

$\Sigma_n: \mathbb{R} \to \mathbb{R}$ signal shape of the n th signal: doubly continuously differentiable periodic function of the period 1, $1 \leq n \leq N$, $$y^n \in \left[ -\frac{1}{2}, \frac{1}{2} \right[$$

phase position of the n th signal, $1 \leq n \leq N$, $A_n^k \in \mathbb{R}_+$ amplitude of the n th signal reflected by the k th target, $1 \leq k \leq K$, $1 \leq n \leq N$, $a^n \in \mathbb{R}$ direct current component of the n th signal $1 \leq n \leq N$, $w_n^m \in \mathbb{R}$ noise component of $s_n^m \in \mathbb{R}$, $1 \leq m \leq M$, $1 \leq n \leq N$.

The object of the signal processing is to determine the unknown distances $D^1, \ldots, D^K \in \mathbb{R}$ from the M·N numbers $s_n^m \in \mathbb{R}, 1 \leq m \leq M, 1 \leq n \leq N$. To enable it to do so, it must know the "system behaviour", i.e. some of the variables occurring in (1-1) must be assumed to be known. Model hypotheses in this regard can be more concisely formulated if the equations (1-1) are written as a matrix equation. For this purpose, the dimensionless variables $$d := \frac{1}{\Lambda^1} \cdot \begin{bmatrix} D^1 \\ \vdots \\ D^K \end{bmatrix} \in \mathbb{R}^K \ \& \ \lambda := \begin{bmatrix} 1 \\ \Lambda^1/\Lambda^2 \\ \vdots \\ \Lambda^1/\Lambda^N \end{bmatrix} \stackrel{(1-0)}{\in} [1, \infty[^N, \quad (1\text{-}2)$$

the vectors $$x := \frac{1}{M} \cdot \begin{bmatrix} 0 \\ 1 \\ \vdots \\ M-1 \end{bmatrix} \in [0, 1[^M, \quad (1\text{-}3)$$

$$y := \begin{bmatrix} y^1 \\ \vdots \\ y^N \end{bmatrix} \in \left[ -\frac{1}{2}, \frac{1}{2} \right[^N, \ a := \begin{bmatrix} a^1 \\ \vdots \\ a^N \end{bmatrix} \in \mathbb{R}^N$$

the matrices $$A := \begin{bmatrix} A_1^1 & \cdots & A_N^1 \\ \vdots & & \vdots \\ A_1^K & \cdots & A_N^K \end{bmatrix} \in \mathbb{R}_+^{K \times N} \ \& \ S := \begin{bmatrix} s_1^1 & \cdots & s_N^1 \\ \vdots & & \vdots \\ s_1^M & \cdots & s_N^M \end{bmatrix}, \quad (1\text{-}4)$$

$$W := \begin{bmatrix} w_1^1 & \cdots & w_N^1 \\ \vdots & & \vdots \\ w_1^M & \cdots & w_N^M \end{bmatrix} \in \mathbb{R}^{M \times N}$$

and the function $\Sigma: \mathbb{R}^{M \times N} \to \mathbb{R}^{M \times N}$, $$\Sigma(X) := \begin{bmatrix} \Sigma_1(X_1^1) & \cdots & \Sigma_N(X_N^1) \\ \vdots & & \vdots \\ \Sigma_1(X_1^M) & \cdots & \Sigma_N(X_N^M) \end{bmatrix} \in \mathbb{R}^{M \times N}, X \in \mathbb{R}^{M \times N} \quad (1\text{-}5)$$

are introduced, by means of which the M·N scalar equations (1-1) go into the matrix equation representing the measuring signal model $$S \stackrel{(1-1)}{\underset{(1-2:5)}{=}} \quad (1\text{-}6)$$

$$1_M \cdot a^T + \sum_{k=1}^{K} [1_M \cdot A(k,:)] \cdot \Sigma \left( 1_M \cdot [d^k \cdot \lambda + y]^T x \cdot 1_N^T \right) + W.$$

Below, the preconditions under which equation (1-6) can be solved for given distance signal data $S \in \mathbb{R}^{M \times N}$ for the variables $d \in \mathbb{R}^K$ primarily of interest are analysed. According to the model, the system configuration parameters $M, N \in \mathbb{N}$ (and consequently $x \in [0, 1[^M)$ and $\lambda \in \mathbb{R}_+^N$ are known whereas the parameters $a \in \mathbb{R}^N$, $A \in \mathbb{R}_+^{K \times N}$ and $$y \in \left[ -\frac{1}{2}, \frac{1}{2} \right[^N$$

are unknown. The identity $$d^k \cdot \lambda + y = (d^k + \delta) \cdot \lambda + (y - \delta \cdot \lambda), \delta \in \mathbb{R}, k \in \{1, \ldots, K\}, \quad (1\text{-}7)$$

clearly shows that $d \in \mathbb{R}^K$ is unambiguously determinable under favourable circumstances when there is sufficient knowledge about $$y \in \left[ -\frac{1}{2}, \frac{1}{2} \right[^N.$$

In addition, the signal shapes $\Sigma_n: \mathbb{R} \to \mathbb{R}, 1 \leq n \leq N$ must obviously be at least partly known.

The usual method for obtaining the required knowledge about $$y \in \left[-\frac{1}{2}, \frac{1}{2}\right[^N$$

and about $\Sigma \mathbb{R}^{d \times N} \to \mathbb{R}^{M \times N}$, i.e. for performing system identification, is the following: the N periodic signals with half-wavelengths (1-0) are fed before and/or after the distance measurement via a reference distance within the device and of length $2 \cdot D^0 \in \mathbb{R}$ or via a target within the device at a distance $D^0 \in \mathbb{R}$ from the transmitter to the receiver, where they are sampled in the same way as the distance measuring signals and averaged to give digital calibration signal data $s_{\pm n}{}^m \in \mathbb{R}$, $1 \leq m \leq M$, $1 \leq n \leq N$, the subscript_ characterising the precalibration (before the measuring) and the subscript$_+$ characterising the postcalibration (after the measurement). The calibration signal data were therefore also modelled according to (1-1) or (1-6), but with K=1 and $d = d^0 \in \mathbb{R}$, $$d^0 := \frac{D^0}{\Lambda^1} \in \mathbb{R}. \tag{1-8}$$

With a uniform transmitting power of the phase meter during the entire measurement, which is required according to the model, the generality $$A_- = A_+ := 1_N^T \tag{1-9}$$

can be set without restriction so that the matrix equation $$S_\pm \overset{(1-6)}{\underset{(1-8;9)}{=}} 1_M \cdot a_\pm^T + \Sigma \left(1_M \cdot [d^0 \cdot \lambda + y_\pm]^T + x \cdot 1_N^T\right) + W_\pm \tag{1-10}$$

results. The setting (1-9) "normalises" the target amplitudes occurring in the measuring signal model (1-6): $A_n{}^k$ is the intensity of the n th signal reflected by the k th target, $1 \leq k \leq K$, $1 \leq n \leq N$, measured as dimensionless multiples of the amplitude of the internal target.

The preconditions "uniform transmitting power" and "stationary targets" make it appear necessary to model the target amplitudes identically for all transmitted signals, i.e. to stipulate $$A = A(:,1) \cdot 1_N^T \in \mathbb{R}_+^{K \times N} \tag{1-11}$$

However, it is found in practice that (1-11) frequently contradicts reality, which is plausible since the medium through which distances are measured, typically the Earth's atmosphere, is often non-stationary during the measurements. The assumption that the target amplitudes of different distance measuring signals are in proportion to one another is more realistic and can be expressed by the stipulation $$\text{Rank}(A) = 1 \tag{1-12}$$

Because of Rank(A)≤K, (1-12) is a restriction only in the multi-target case K>1, which is unrealistic in certain situations, for example when the medium through which the measurement is made is highly inhomogeneous and non stationary. The equations (1-11) and (1-12) are therefore only optional additions to the measuring signal model (1-6).

The identity (1-7), which is also true for k=0 with $y_\pm$ instead of y, shows that $$y_\pm \in \left[-\frac{1}{2}, \frac{1}{2}\right[^N$$

can be determined from the calibration signal data $S_\pm \in \mathbb{R}^{M \times N}$ at best when $d^0 \in \mathbb{R}$ is T known, which can be assumed according to the model since a reference distance within the device or target within the device can be realised on the part of the apparatus and can be precisely measured. If only one (pre- or post-) calibration is carried out, there is no expedient alternative to the "stationary" model hypothesis $$y = y_- \text{ or } y = y_+, \tag{1-13}$$

which postulates identical phase positions of distance and calibration measuring signals. This postulate stipulates freedom of the receiving electronics from drift and is consequently far from reality. If a precalibration and a postcalibration are carried out, a non-stationary relationship between the phases which describes the physical circumstances more realistically can be postulated. A simple deterministic phase drift model is the usual first-order differential equation $$\frac{\partial y}{\partial t}(t) = v \cdot [y_\infty - y(t)], t \in \mathbb{R}, \text{ with } v \in \overline{\mathbb{R}_+^N} \,\&\, y_\infty \in \mathbb{R}^N, \tag{1-14}$$

with the solutions set $$y(t)^{(1-14)} = y_\infty + \eta \circ e^{-t \cdot v}, t \in \mathbb{R}, \eta \in \mathbb{R}^N, \tag{1-15}$$

which is interpreted as follows: the phases $y \in \mathbb{R}^N$—since according to the model the signals are 1-periodic functions, $$y \in \left[-\frac{1}{2}, \frac{1}{2}\right[^N$$

can be replaced by the specification $y \in \mathbb{R}^N$—were moved, for example by switching processes, out of the equilibrium positions $y_\infty \in \mathbb{R}^N$ assumed according to the model, to which they now return at speeds which are proportional to their deflections from the equilibrium positions, it being possible for $v \in \overline{\mathbb{R}^N}$ to be introduced as proportionality factors.

If $\tau_-{}^n \in \mathbb{R}_+$ or $\tau_+{}^n \in \mathbb{R}_+$ designates the mean time which elapses between the precalibration measurement and the distance measurement or between the distance measurement and the postcalibration measurement with the n th signal, $1 \leq n \leq N$, (1-15) with the aid of the vectors $$\tau_\pm := \begin{bmatrix} \tau_\pm^1 \\ \vdots \\ \tau_\pm^N \end{bmatrix} \in \mathbb{R}_+^N \tag{1-16}$$

gives the relationships $$y \overset{(1-15)}{\approx} y_\infty + \eta \,\&\, y_\pm \overset{(1-15)}{\underset{(1-16)}{\approx}} y_\infty + \eta \cdot e^{\mp v \cdot \tau_\pm}, \tag{1-17}$$

if, for each component in (1-15), the time scale is individually chosen so that each distance measurement takes place at the time 0. From (1-17), it furthermore follows $$y \stackrel{(1-17)}{\approx} y_+ + [1_N - e^{-\nu \cdot \tau_+}] \cdot \eta \stackrel{(1-17)}{\approx} y_+ + \frac{[1_N - e^{-\nu \cdot \tau_+}] \cdot [y_- - y_+]}{e^{\nu \cdot \tau_-} - e^{\nu \cdot \tau_+}} = \qquad (1\text{-}18)$$
$$\frac{[1_N - e^{-\nu \cdot \tau_+}] \cdot y_- + [e^{\nu \cdot \tau_-} - 1_N] \cdot y_+}{e^{\nu \cdot \tau_-} - e^{\nu \cdot \tau_+}},$$

where, in the case of $v^n=0$, the right side of (1-18) is replaced according to L'Hôpital's rule by the limit $$\lim_{v^n \downarrow 0} \frac{[1 - e^{-v^n \cdot \tau_+^n}] \cdot y_-^n + [e^{v^n \cdot \tau_-^n} - 1] \cdot y_+^n}{e^{v^n \cdot \tau_-^n} - e^{-v^n \cdot \tau_+^n}} = \qquad (1\text{-}19)$$

$$\lim_{v^n \downarrow 0} \frac{\frac{\partial}{\partial v^n}\left[[1 - e^{-v^n \cdot \tau_+^v}] \cdot y_-^n + [e^{v^n \cdot \tau_-^n} - 1] \cdot y_+^n\right]}{\frac{\partial}{\partial v^n}[e^{v^n \cdot \tau_-^n} - e^{-v^n \cdot \tau_+^n}]} = \frac{\tau_-^n \cdot y_+^n + \tau_+^n \cdot y_-^n}{\tau_-^n + \tau_+^n},$$

$n \in \{1, \ldots, N\}$, and, since calibration measurements serve inter alia the purpose of obtaining knowledge about the phase positions $y \in R^N$ via $y_\pm \in R^n$, (1-18) implies that the variables $v, \tau_-, \tau_+ \in R_+^N$ must be assumed to be known according to the model. This is not unrealistic since the times $\tau_\pm \in R_+^N$ can be measured, and $v \in R_+^N$ can be determined from special measurements in which the internal target is surveyed instead of external targets, i.e. the internal target is surveyed three times in succession.

(1-17) results in $$y_\pm \stackrel{(1-17)}{\approx} y - [1_N - e^{\mp v \cdot \tau_\pm}] \cdot \eta = \qquad (1\text{-}20)$$
$$y - \alpha_\pm \cdot \eta \text{ with } \alpha_\pm := 1_N - e^{\mp v \cdot \tau_\pm} \in R^N,$$

which, when substituted in (1-10), gives the matrix equations $$S_\pm \stackrel{(1\text{-}10)}{=} 1_M \cdot a_\pm^T + \Sigma(1_M \cdot [d^0 \cdot \lambda + y - \alpha_\pm \cdot \eta]^T + x \cdot 1_N^T) + W_\pm \qquad (1\text{-}21)$$

constituting a calibration signal model.

The equations (1-6) and (1-21) are constituents of the (overall) signal model, which can be optionally supplemented by the sub-condition (1-11) or (1-12) and on which the signal processing is based.

The 1-periodicity of the function $\Sigma: R^{M \times N} \to R^{M \times N}$ assumed according to the model and (1-6) imply that, in the case $\lambda \in Q^N$ in which all components of $\lambda$ are rational numbers, an infinite number of $d \in R^K$ produce the same distance signal data $S \in R^{M \times N}$. Since $Q^N$ is tight in $R^N$, i.e. every vector in $R$ can be approximated as accurately as desired by a vector from $Q^N$, in practice infinite ambiguity is general with regard to $d \in R^K$; unambiguity can be forced only by additional requirements. Usually, $$d^- \cdot 1_K \leq d < d^+ \cdot 1_K \qquad (1\text{-}22)$$

with specified measuring range limits $d^- < d^+$ or $$D^- \stackrel{(1\text{-}2)}{=} \Lambda^1 \cdot d^- < D^+ \stackrel{(1\text{-}2)}{=} \Lambda^1 \cdot d^+$$

is required, the bounds $d^\pm \in R$ and $D^\pm \in R$ being chosen so that unambiguity is guaranteed.

Finally, the noise components $W, W_\pm \in R^{M \times N}$ of the distance and calibration signal data $S, S_\pm \in R^{M \times N}$ are also unknown. To enable the equations (1-6) and (1-21) nevertheless to be "solved" for $d \in R^K$, the statistical behaviour of the noise must be—at least structurally—known.

$$\begin{bmatrix} W_- \\ W \\ W_+ \end{bmatrix} \in R^{3 \cdot M \times N}$$

is therefore modelled as a random matrix with probability density $n: R^{3 \cdot M \times N} \to R_+$ which—at most apart from some parameters characterising it—is assumed to be known. The modelling of the noise a as random matrix and the specification of its probability density $n: R^{3 \cdot M \times N} \to R_+$ are a constituent of the signal model which supplements (1-6) and (1-21).

The mathematically simplest model assumption relating to n which however is rather far from reality owing to the limitation of the distance and calibration signal data $S, S_\pm \in R^{M \times N}$ is a normal distribution with $$E\left[\begin{bmatrix} W_- \\ W \\ W_+ \end{bmatrix}\right] = O_{3 \cdot M \times N} \ \& \ E\left[\begin{bmatrix} W_-(:,n) \\ W(:,n) \\ W_+(:,n) \end{bmatrix} \cdot \begin{bmatrix} W_-(:,l) \\ W(:,l) \\ W_+(:,l) \end{bmatrix}^T \right] \qquad (1\text{-}23)$$

$$= \delta_{nl} \cdot \sigma^2 \cdot \begin{bmatrix} C_-^{(n)} & O_{M \times M} & O_{M \times M} \\ O_{M \times M} & C^{(n)} & O_{M \times M} \\ O_{M \times M} & O_{M \times M} & C_+^{(n)} \end{bmatrix},$$

$$1 \leq n, l \leq N,$$

where $C^{(n)}, C_\pm^{(n)} \in R^{M \times M}$ designates symmetrical positive definite matrices which are assumed to be known, $1 \leq n \leq N$, $\delta_{nl}=1$ if n=l and $\delta_{nl}=0$ otherwise, and $\sigma \in R_+$ designates an unknown scaling factor. Model hypothesis (1-23) postulates in particular the lack of correlation between the distance and calibration signal data of different received signals; it reflects the situation that signals of different half-wavelengths and distance and calibration measuring signals are transmitted and received at separate times. The unknown scaling factor $\sigma \in R_+$ makes it clear that only the relative noise values, but not the absolute ones, are assumed to be known. (1-23) gives the probability density $$n(W_-, W, W_+) \stackrel{(1\text{-}23)}{=} \qquad (1\text{-}24)$$

-continued $$\frac{\exp\left\{-\frac{1}{2\cdot\sigma^2}\cdot\sum_{n=1}^{N}\left\{\begin{array}{l}W_{-}(:,n)^T\cdot[C_{-}^{(n)}]^{-1}\cdot W_{-}(:,n)+\\ W(:,n)^T\cdot[C^{(n)}]^{-1}\cdot W(:,n)+\\ W_{+}(:,n)^T\cdot[C_{+}^{(n)}]^{-1}\cdot W_{+}(:,n)\end{array}\right\}\right\}}{(2\cdot\pi\cdot\sigma^2)^{\frac{3\cdot M\cdot N}{2}}\cdot\prod_{n=1}^{N}\sqrt{\det(C_{-}^{(n)})\cdot\det(C^{(n)})\cdot\det(C_{+}^{(n)})}}$$

on which the signal processing is based.

The question arises as to how the signal model equations (1-6) and (1-21) are to be "solved" for $d\in[d^-\cdot 1_K, d^+\cdot 1_K[\subset \mathbb{R}^K$.

A tried and tested approach is to estimate $d\in[d^-\cdot 1_K, d^+\cdot 1_K[$ [—and necessarily also $y, \eta \in \mathbb{R}^N$, $a, a_\pm \in \mathbb{R}^N$, $A \in \mathbb{R}_+^{K\times N}$ and the parameters characterising $\Sigma: \mathbb{R}^{M\times N} \to \mathbb{R}^{M\times N}$—in the sense of maximum likelihood (ML), as described, for example, in chapter 18 of the standard work "A. Stuart, J. K. Ord & S. Arnold: Kendalls's Advanced Theory of Statistics, Volume 2A, $6^{th}$ Edition; Arnold, London, 1999", i.e. to assign to them the values $d\in[d^-\cdot 1_K, d^+\cdot 1_K[$, etc., which maximise the probability density $n(W_-, W, W_+)$ if the random matrices $W$, $W_\pm \in \mathbb{R}^{M\times N}$ according to the signal model (1-6) and (1-21) are substituted by the distance and calibration signal data $S$, $S_\pm \in \mathbb{R}^{M\times N}$ and the model parameters. Since the covariance matrices $C^{(n)}, C_\pm^{(n)} \in \mathbb{R}^{M\times M}$, $1 \le n \le N$—which logically is not necessary but is expedient in practice—are assumed to be known, a standard argument of estimation theory shows that these so-called ML estimated values $d\in[d^-\cdot 1_K, d^+\cdot 1_K[$, etc for $d\in[d^-\cdot 1_K, d^+\cdot 1_K[$, etc are characterised in the case of (1-24) as the minimum of the sum $$\sum_{n=1}^{N}\left[W_{-}(:,n)^T\cdot[C_{-}^{(n)}]^{-1}\cdot W_{-}(:,n)^T\cdot[C^{(n)}]^{-1}\cdot W(:,n)+ \right. \tag{2-0}$$
$$\left. W_{+}(:,n)^T\cdot[C_{+}^{(n)}]^{-1}\cdot W_{+}(:,n)\right],$$

in which the random matrices $W, W_\pm \in \mathbb{R}^{M\times N}$ according to the signal model (1-6) and (1-21) are substituted by the distance and calibration signal data $S, S_\pm \in \mathbb{R}^{M\times N}$ and the model parameters. In particular, the ML estimated values are independent of the scaling parameter $\sigma \in \mathbb{R}$, which shows that the ML estimated values are independent of the average noise level, which of course is not true for the quality thereof.

The knowledge of the signal shapes $\Sigma: \mathbb{R}^{M\times N} \to \mathbb{R}^{M\times N}$ required by the signal model (1-6) and (1-21) prompts as simple a choice as possible thereof. Conventional (one-target) phase meters typically use sinusoidal signals of different frequencies. This classical choice is inexpedient in the multi-target case; more expedient are sums of sinusoidal fundamental frequencies and some of their lowest harmonics. In practice, these can be produced by emitting non-sinusoidal periodic signals which have a major part of their energy in the low-frequency part of their spectrum and filtering their echoes reflected by the targets by means of a low-pass filter so that only the $L \in \mathbb{N}$ lowest harmonics of their Fourier decompositions contribute to the distance and calibration signal data. For such signal shapes, it is possible to use the approach $$\sum_{n}(t) := \sum_{l=1}^{L}[b_n^l\cdot\cos(2\cdot l\cdot\pi\cdot t) + b_n''\cdot\sin(2\cdot l\cdot\pi\cdot t)] \tag{3-0}$$
$$= \operatorname{Re}\left\{\sum_{l=1}^{L}B_n^l\cdot e^{2\cdot l\cdot\pi\cdot i\cdot t}\right\}, t \in \mathbb{R}, 1 \le n \le N,$$

with the unknown parameters $$B := \begin{bmatrix} B_1^1 & \cdots & B_N^1 \\ \vdots & \ddots & \vdots \\ B_1^L & \cdots & B_N^L \end{bmatrix} \in \mathbb{C}^{L\times N}, \tag{3-1}$$

$$B_n^l \stackrel{(3-0)}{:=} b_n^l - i\cdot b_n^{\prime l}, 1 \le l \le L \;\&\; \operatorname{Im}\{B_n^1\} := 0, 1 \le v \le N,$$

the condition $\operatorname{Im}\{B(1,:)\} = O_N^T$ eliminating the irrelevant degrees of translational freedom of the signal shapes $\Sigma_n \mathbb{R} \to \mathbb{R}$, $1 \le n \le N$.

The $3\cdot M\cdot N$ scalar signal data $S, S_\pm \in \mathbb{R}^{M\times N}$ may then be seen—provided that neither (1-11) nor (1-12) is considered—alongside the $K+(4+K+2\cdot L-1)\cdot N$ unknown real parameters $d\in \mathbb{R}^K$, $y, \eta \in \mathbb{R}^N$, $a, a_\pm \in \mathbb{R}^N$, $A \in \mathbb{R}^{K\times N}$, $\operatorname{Re}\{B\}, \operatorname{Im}\{B\} \in \mathbb{R}^{L\times N}$, so that at least the following should be true $$3\cdot M\cdot N \ge K + (3 + K + 2\cdot L)\cdot N \text{ or} \tag{3-2}$$
$$M \ge 1 + \frac{K\cdot(1+1/N) + 2\cdot L}{3}.$$

In practice, the number $M$ of signal samplings per signal period is chosen to be much greater than required by (3-2); an expedient choice is $$K \le L < \frac{M}{2}, \tag{3-3}$$

which can be assumed according to the model.

If, in agreement with customary practice, the noise of the n th receiving channel is modelled as a mean value-free stationary Gaussian process, and it is assumed, in line with usual technical practice, that the M-fold equitemporal sampling per signal period of the n th received signal takes place in an uninterrupted time sequence during $I'' \in \mathbb{N}$ signal periods, a calculation based on probability theory shows that the covariance matrices $C^{(n)}, C_\pm^{(n)} \in \mathbb{R}^{M\times M}$ are symmetrical Toeplitz matrices which, for a sufficiently short correlation time of the Gaussian process and for sufficiently large $I''$, are approximately and, at the limit $I'' \to \infty$, are even exactly circulant, $1 \le n \le N$. Since 1000 is a typical order of magnitude for $I''$, it is not unrealistic to assume that the covariance matrices $C^{(n)}, C_\pm^{(n)} \in \mathbb{R}^{M\times M}$ as an additional constituent of the signal model are circulant, $1 \le n \le N$.

The circulant matrices $Z \in \mathbb{C}^{M\times M}$ are exactly those which the discrete Fourier transformation $F_M \in \mathbb{C}^{M\times M}$ in $\mathbb{C}^M$, i.e. the complex-value unitary and symmetrical matrix with elements $$[F_M]_{m'}^m := \frac{1}{\sqrt{M}} \cdot e^{-2\pi i \cdot \frac{(m-1)\cdot(m'-1)}{M}} \qquad (3\text{-}4)$$

$$= \frac{1}{\sqrt{M}} \cdot e^{2\pi i \cdot \frac{(m-1)\cdot(M+1-m')}{M}} \in \mathbb{C},$$

$$1 \le m, m' \le M,$$

unitarily diagonalises, i.e. for which $F_M \cdot Z \cdot F_M^H \in \mathbb{C}^{M \times M}$ is diagonal. This situation makes it possible to represent the symmetrical covariance matrices $C^{(n)}, C_{\pm}^{(n)} \in \mathbb{R}^{M \times M}$ assumed to be positive definite and circulant as follows:

$$C^{(n)} = F_M^H \cdot [\text{Diag}(\sigma_n)]^2 \cdot F_M, \ \sigma_n = \begin{bmatrix} \sigma_n^0 \\ \vdots \\ \sigma_n^{M-1} \end{bmatrix} \in \mathbb{R}_+^M \qquad (3\text{-}5)$$

&

$$C_{\pm}^{(n)} = F_M^H \cdot [\text{Diag}(\sigma_{\pm n})]^2 \cdot F_M, \ \sigma_{\pm n} = \begin{bmatrix} \sigma_{\pm n}^0 \\ \vdots \\ \sigma_{\pm n}^{M-1} \end{bmatrix} \in \mathbb{R}_+^M$$

$$\sigma_n^m = \sigma_n^{M-n} \quad 1 \le m < M$$
$$\sigma_{\pm n}^m = \sigma_{\pm n}^{M-m} \quad 1 \le n \le N .$$

Each of the matrices $C^{(n)}, C_{\pm}^{(n)} \in \mathbb{R}^{M \times M}$ can therefore be specified by $[M/2]$ positive parameters. It will be found that the ML estimated values depend only on the $3 \cdot L$ parameters $\sigma_{-n}^l, \sigma_n^l, \sigma_{+n}^l \in \mathbb{R}_+$, $1 \le l \le L$, the values of which can be learnt about by means of a suitable noise-identification method and are therefore assumed according to the model to be known.

The ML estimation of the unknown parameters of the signal model from the distance and calibration signal data $S, S_{\pm} \in \mathbb{R}^{M \times N}$ or the minimisation of (2-0) is a complex and extremely computationally intensive undertaking, not least because the signal model contains numerous parameters whose values are not even of interest. It is therefore appropriate analytically to eliminate as many of the uninteresting model parameters as possible from the minimisation.

If the equations (1-6), (1-21), (3-0) and (3-5) are substituted into the sum (2-0) to be minimised, the matrices $S, S_{\pm} \in \mathbb{R}^{M \times N}$ occur only in the products $F_M \cdot S, F_M \cdot S_{\pm} \in \mathbb{C}^{M \times N}$, and it is expedient to write the elements thereof, if they are required, in polar form: because of $S, S_{\pm} \in \mathbb{R}^{M \times N}$, $F_M \cdot S$, $F_M \cdot S_{\pm} \in \mathbb{C}^{M \times N}$ have the unambiguous representations $$[F_M \cdot S]_n^{1+l} = \sqrt{M} \cdot r_n^l \cdot e^{2\pi i \cdot \varphi_n^l} \ \text{mit} \qquad (4\text{-}0)$$

$$r_n^l \in \overline{\mathbb{R}_+} \ \& \ \varphi_n^l \in \left[ -\frac{1}{2}, \frac{1}{2} \right[ \qquad 1 \le l \le L$$

$$[F_M \cdot S_{\pm n}]_n^{1+l} = \sqrt{M} \cdot r_{\pm n}^l \cdot e^{2\pi i \cdot \varphi_{\pm n}^l} \ \text{mit} ,$$

$$r_{\pm n}^l \in \overline{\mathbb{R}_+} \ \& \ \varphi_{\pm n}^l \in \left[ -\frac{1}{2}, \frac{1}{2} \right[ \qquad 1 \le n \le N$$

With the aid of the matrices $$Q, Q_{\pm}, Q' \in \mathbb{R}^{L \times N}$$

with $$Q_n^l := \frac{r_n^l}{\sigma_n^l},$$

$$Q_{\pm n}^l := \frac{r_{\pm n}^l \cdot \sigma_n^l}{[\sigma_{\pm}^l]^2},$$

$$Q_n^{\prime l} := \frac{\sigma_n^l \cdot \sqrt{[\sigma_{-n}^l]^2 + [\sigma_{+n}^l]^2}}{\sigma_{-n}^l \cdot \sigma_{+n}^l}, \quad \begin{array}{l} 1 \le l \le L \\ 1 \le n \le N \end{array},$$

$$\Psi_{\pm} = \begin{bmatrix} \psi_{\pm 1}^1 & \cdots & \psi_{\pm N}^1 \\ \vdots & \ddots & \vdots \\ \psi_{\pm N}^L & \cdots & \psi_{\pm N}^L \end{bmatrix} : \qquad (4\text{-}2)$$

$$= \begin{bmatrix} \varphi_1^1 & \cdots & \varphi_N^1 \\ \vdots & \ddots & \vdots \\ \varphi_N^L & \cdots & \varphi_N^L \end{bmatrix} - \begin{bmatrix} \varphi_{\pm 1}^1 & \cdots & \varphi_{\pm N}^1 \\ \vdots & \ddots & \vdots \\ \varphi_{\pm N}^L & \cdots & \varphi_{\pm N}^L \end{bmatrix} \in \left] -1, 1 \right[^{L \times N},$$

and the vectors $$\delta := d - d^0 \cdot 1_K \in \mathbb{R}^K \ \& \ \begin{bmatrix} \delta^- \\ \delta^+ \end{bmatrix} := \begin{bmatrix} d^- - d^0 \\ d^+ - d^0 \end{bmatrix} \in \mathbb{R}^2 \qquad (4\text{-}3)$$

$$\left( \stackrel{(1\text{-}22)}{\Longrightarrow} \delta^- < \delta^+ \right)$$

$$\beta := -\frac{\alpha_-}{\alpha_+} \stackrel{(1\text{-}20)}{=} \frac{e^{v \circ \tau_-} - 1_N}{1_N - e^{-v \circ \tau_+}} \stackrel{(1\text{-}14)}{\underset{(1\text{-}16)}{\in}} \mathbb{R}_+^N \ \& \qquad (4\text{-}4)$$

$$\varsigma := \alpha_+ \circ \eta \stackrel{(1\text{-}20)}{=} [1_N - e^{-v \circ \tau_+}] \circ \eta \in \mathbb{R}^N,$$

(if $v^n = 0$, then $$\beta^n \stackrel{(4\text{-}4)}{:=} \lim_{v^n \downarrow 0} \frac{e^{v \circ \tau_-} - 1_N}{1_N - e^{-v \circ \tau_+}}$$

$$= \lim_{v^n \downarrow 0} \frac{\frac{\partial}{\partial v^n}[e^{v \circ \tau_-} - 1_N]}{\frac{\partial}{\partial v^n}[1_N - e^{-v \circ \tau_+}]}$$

$$= \frac{\tau_-^n}{\tau_+^n} \stackrel{(1\text{-}16)}{\in} \mathbb{R}_+$$

set, $n \in \{1, \ldots, N\}$), it emerges from (3-0), (3-5) and (4-0)-(4.4) that the minimisation of (2-0) is equivalent to the maximisation of the function $\pounds_{K,L}: \mathbb{R}^K \times \mathbb{R}^N \times \mathbb{R}^{K \times N} \to \mathbb{R}$ defined according to $$\pounds_{K,L}(\delta, \varsigma, A) := \sum_{n=1}^{N} \sum_{l=1}^{L} \frac{\left| \begin{array}{l} Q_{-n}^l \cdot e^{2\pi i \cdot (\psi_{-n}^l + l\beta^n \cdot \varsigma^n)} + \\ Q_n^l \cdot A(:,n)^T \cdot e^{2\pi i \cdot l\lambda^n \cdot \delta} + \\ Q_{+n}^l \cdot e^{2\pi i \cdot (\psi_{+n}^l - l\varsigma^n)} \end{array} \right|^2}{|A(:,n)^T \cdot e^{2\pi i \cdot l\lambda^n \cdot \delta}|^2 + [Q_n^{\prime l}]^2} . \qquad (4\text{-}5)$$

The ML estimated values $\hat{\delta} \in [\delta^- \cdot 1_K, \delta^+ \cdot 1_K[$, $\hat{\varsigma} \in \mathbb{R}^N$ and $\hat{A} \in \mathbb{R}_+^{K \times N}$ for RT the unknown model parameters $\delta \in [\delta^- \cdot 1_K, \delta^+ \cdot 1_K[$, $\varsigma \in \mathbb{R}^N$ and $A \in \mathbb{R}_+^{K \times N}$ are consequently characterised as the maximum $(\hat{\delta}, \hat{\varsigma}, \hat{A})$ of the function $\pounds_{K,L}$ in $[\delta^- \cdot 1_K, \delta^+ \cdot 1_K[ \times \mathbb{R}^N \times \mathbb{R}^{K \times N}$, it optionally also being possible to observe boundary condition (1-11) or (1-12).

It is evident from (4-5) that, in the case of $\lambda \in \mathcal{Q}^N$, the function $\pounds_{K,L}: \mathbb{R}^K \times \mathbb{R}^N \times \mathbb{R}^{K \times N} \to \mathbb{R}$ is periodic with respect to its first argument; this prompted the limitation (1-22). However, the second argument of $\pounds_{K,L}$ also gives rise to uncertainty in the first argument, as can be shown for the simplest special case K=L=1: because of $$e^{2\pi \cdot i \cdot (\psi^1_{-n} + \beta^n \cdot \varsigma^n)} = e^{2\pi \cdot i \cdot (\psi^1_{+n} - \varsigma^n)} \Leftrightarrow \psi^1_{-n} + \beta^n \cdot \varsigma^n + \ell = \psi^1_{+n} - \varsigma^n \quad (4\text{-}6)$$

$$\Leftrightarrow \varsigma^n = \hat{\varsigma}^n_\ell := \frac{\psi^1_{+n} - \psi^1_{-n} - \ell}{1 + \beta^n},$$

$\ell \in \mathbb{Z}$, the numbers $\hat{\varsigma}^n_\ell \in \mathbb{R}$, $l \in \mathbb{Z}$, are candidates for maxima of $\pounds_{1,1}$. Since it can be shown that the complex numbers $$e^{2\pi \cdot i \cdot (\psi^1_{-n} + \beta^n \cdot \hat{\varsigma}^n_\ell)} \stackrel{(4\text{-}6)}{=} \quad (4\text{-}7)$$

$$e^{2\pi \cdot i \cdot (\psi^1_{+n} - \hat{\varsigma}^n_\ell)} \stackrel{(4\text{-}6)}{=} \exp\left\{2 \cdot \pi \cdot i \cdot \left(\frac{\psi^1_{-n} + \beta^n \cdot \psi^1_{+n}}{1 + \beta^n} + \frac{\ell}{1 + \beta^n}\right)\right\},$$

$\ell \in \mathbb{Z}$, lie close together on the unit circle in the complex plane $\mathcal{C}$ if $\beta^n \in \mathbb{R}$, is irrational, the supremum over $\zeta^n \in \mathbb{R}$ of the n th summand of $\pounds_{1,1}$ for arbitrary $\delta \in [\delta^-, \delta^+[$ and $A_n^1 \in \mathbb{R}$ is therefore $$\frac{[Q^1_{-n} + Q^1_n \cdot A^1_n + Q^1_{+n}]^2}{[A^1_n]^2 + [Q^1_n]^2} \quad (4\text{-}8)$$

an expression which is independent of $\delta$.

The conclusion from the above finding is that the phase drift model (1-14) cannot guarantee the unambiguous determinability of the distances $\delta \in \mathbb{R}$. It must consequently be replaced by a more restrictive model or further limited. Since the phase drift model (1-14) together with model approach (3-5) has permitted the elimination of the parameters $$y \in \left[-\frac{1}{2}, \frac{1}{2}\right[^N$$

and $B \in \mathcal{C}^{L \times N}$ from the estimation task and hence a substantial reduction in the complexity of the problem, the second alternative is preferred.

The above analysis of (4-5) in the special case K=L=1 reveals the cause of the undesired ambiguity: the phase drift model (1-14) permits individual phases to "migrate through" an arbitrary number of periods in the time between precalibration and post calibration; however, this cannot be determined by only two calibration measurements. It is therefore expedient to stipulate $$y_+ - y_- \in \left[\frac{1}{2} \cdot 1_N, \frac{1}{2} \cdot 1_N\right[; \quad (4\text{-}9)$$

between precalibration and postcalibration, the phase drifts should be so small that phase ambiguities are ruled out. This is a requirement with regard to the hardware, which is logically indispensable with only two calibration measurements but can also be technically realised. Because $$y_- - y_+ \stackrel{(1\text{-}20)}{=} [\alpha_+ - \alpha_-] \cdot \eta \quad (4\text{-}10)$$

$$\stackrel{(4\text{-}4)}{=} [1_N + \beta] \cdot \alpha_+ \cdot \eta$$

$$\stackrel{(4\text{-}4)}{=} [1_N + \beta] \cdot \varsigma,$$

and (4-4), (4-9) is equivalent to $$\varsigma \in \left[\frac{-1_N}{2 \cdot [1_N + \beta]}, \frac{1_N}{2 \cdot [1_N + \beta]}\right[; \quad (4\text{-}11)$$

the maximisation of $\pounds_{K,L}$ should therefore take place in accordance with the model while maintaining the condition (4-11).

The reduction of the minimisation of (2-0) to the maximisation of the function $\pounds_{K,L}: \mathbb{R}^K \times \mathbb{R}^N \times \mathbb{R}^{K \times N} \to \mathbb{R}$ defined according to (4-5) in the set $$B := \left[\begin{array}{c} \delta^- \cdot 1_K \\ \delta^+ \cdot 1_K \end{array}\left[\times \left[\begin{array}{c} \frac{-1_N}{2 \cdot [1_N + \beta]} \\ \frac{1_N}{2 \cdot [1_N + \beta]} \end{array}\right[, \right.\right. \times \mathbb{R}^{K \times N}_+ \subset \mathbb{R}^K \times \mathbb{R}^N \times \mathbb{R}^{K \times N} \quad (5\text{-}0)$$

has the abovementioned advantage that it eliminates the parameters $$y \in \left[-\frac{1}{2}, \frac{1}{2}\right[^N$$

and $B \in \mathcal{C}^{L \times N}$, which specify the transmitted signals according to (3-0), (1-6) and (1-21), The maximisation of $\pounds_{K,L}$ instead of the minimisation of (2-0) thus comprises in particular an online identification of the transmitted signals. This advantage is achieved with the high nonlinearity of the function $\pounds_{K,L}$, which has many local maxima in the set B, which considerably complicates its maximisation. Although there are global numerical maximisation methods, when applied to the highly non-concave function $\pounds_{K,L}$ these would require an unacceptable computational effort. Consequently, routes feasible in practice for maximising $\pounds_{K,L}$ lead via iterative maximisation methods which, starting from an initial value $(\hat{\delta}, \hat{\varsigma}, \hat{A}) \in \mathbb{R}^K \times \mathbb{R}^N \times \mathbb{R}^{K \times N}$ converge to a local maximum $(\hat{\delta}, \hat{\varsigma}, \hat{A}) \in B$ of $\pounds_{K,L}$, which is hopefully a global maximum of $\pounds_{K,L}$ in B. Such iterative maximisations—although non trivial—are routine tasks of numerical optimisation for which numerous tried and tested algorithms are available. Since the first and second derivatives of the $\pounds_{K,L}$ defined according to (4-5) can be calculated analytically, efficient methods for the iterative maximisation of $\pounds_{K,L}$ in B can be used.

More problematic is the provision of an initial value $(\hat{\delta}, \hat{\varsigma}, \hat{A}) \in \mathbb{R}^K \times \mathbb{R}^N \times \mathbb{R}^{K \times N}$ which is close to a global maximum of $\pounds_{K,L}$ in B. The latter is necessary since iterative maximisation methods are typically designed so that they converge to a local maximum closest to the initial value. A method which calculates such an initial value is given below.

The guiding principle of this method is to choose as the initial value $(\hat{\delta},\hat{\zeta},\hat{A}) \in \mathbb{R}^K \times \mathbb{R}^N \times \mathbb{R}^{K \times N}$ an approximate value of a global maximum of the function $\pounds_{K,K}: \mathbb{R}^K \times \mathbb{R}^N \times \mathbb{R}^{K \times N} \to \mathbb{R}$ defined according to (4-5), i.e. to choose L=K and to ignore the optional boundary conditions (1-11) and (1-12). If K is unknown, K is first chosen as a maximum number of targets simultaneously to be surveyed. Below, it is shown how such an initial value can be calculated with the assumption $$\min_{\substack{1 \leq k \leq K \\ 1 \leq n \leq N}} Q^k_{\pm n} > 0 \ \& \ \min_{1 \leq n \leq N} \max_{1 \leq k \leq K} Q^k_n > 0. \tag{6-0}$$

As can be seen from (4-0) and (4-1), assumption (6-0) postulates that all signals contain non-vanishing harmonic components of the orders up to and including K and each measuring signal reflected by the targets contains at least one non-vanishing harmonic component of the order $\leq$K. This postulate can be technically easily fulfilled with a sufficiently large number of N of signals, some of which however are excluded from the signal processing, or by means of an adaptive choice of the half-wavelengths (1-0).

By suitable mathematical transformation of the n th outer summand $$\pounds^n_K(\delta, \zeta^n, A(:,n)) := \sum_{k=1}^{K} \frac{\left| \begin{array}{c} Q^k_{-n} \cdot e^{2\pi i (\psi^k_{-n} + k \cdot \beta^n \cdot \zeta^n)} + \\ Q^k_n \cdot A(:,n)^T \cdot e^{2\pi i \cdot k \cdot \lambda^n \cdot \delta} + \\ Q^k_{+n} \cdot e^{2\pi i (\psi^k_{+n} - k \cdot \zeta^n)} \end{array} \right|^2}{|A(:,n)^T \cdot e^{2\pi i \cdot k \cdot \lambda^n \cdot \delta}|^2 + [Q'^k_n]^2}, \tag{6-1}$$

of the function $\pounds_{K,K}$ defined according to (4-5), it is possible to show that this function $\pounds^n_K: \mathbb{R}^K \times \mathbb{R} \times \mathbb{R}^K \to \mathbb{R}$ assumes its maximum exactly when $\zeta''^n \in \mathbb{R}$ is chosen as the maximum $\zeta''^n \in \mathbb{R}$—which owing to (4-11) preferably has the smallest magnitude—of the function $\gamma_n: \mathbb{R} \to \mathbb{R}$ defined according to $$\gamma_n(\zeta''^n) := \sum_{k=1}^{K} \frac{Q^k_{-n} \cdot Q^k_{+n}}{[Q'^k_n]^2} \cdot \cos\left(2 \cdot \pi \cdot \left[\frac{\psi^k_{+n} - \psi^k_{-n} - k \cdot}{(1 + \beta^n) \cdot \zeta''^n}\right]\right), \tag{6-2}$$

$\zeta''^n \in \mathbb{R}$, $1 \leq n \leq N$, and when $\lambda^n \cdot \delta \in \mathbb{R}^K$ and $A(:,n) \in \mathbb{R}^K$ assume values $\epsilon_n \in \mathbb{R}^K$ and $A_n \in \mathbb{R}^{\overline{K}}$, for which $$\check{A}^T_n \cdot e^{2\pi i \cdot k \cdot \check{\epsilon}_n} = \frac{Q^k_n \cdot [Q'^k_n]^2}{Q^k_{-n} \cdot e^{-2\pi i (\psi^k_{-n} + k \cdot \beta''^n \cdot \zeta''^n)} + Q^k_{+n} \cdot e^{-2\pi i (\psi^k_{+n} - k \cdot \zeta''^n)}}, \tag{6-3}$$

$1 \leq k \leq K, 1 \leq n \leq N$, is true. That for each $n \in \{1, \ldots, N\}$ the K equations (6-3) can be solved for $\epsilon_n \in \mathbb{R}$ and $A_n \in \mathbb{R}^{\overline{K}}_+$ is a non-trivial result which is established by a theorem of Constantin Carathéodory, published in the article "C. Carathéodory: Über den Variabilitätsbereich der Fourierschen Konstanten von positiven harmonischen Funktionen [The Range of Variability of the Fourier Constants of Positive Harmonic Functions]; Rend. Circ. Mat. Palermo 32 (1911), pages 193-217". The representation on the left in (6-3) is therefore referred to—for fixed $n \in \{1, \ldots, N\}$—as the Carathéodory representation of the K complex numbers on the right in (6-3). In the case of K=1, the left side of (6-3) is the polar representation of the complex number on the right in (6-3); the Carathéodory representation of a plurality of complex numbers is therefore a generalisation of the polar representation of a (single) complex number.

The constructional evidence for Carathéodory's proposition, given by G. Szegö in §4.1 of the monograph "U. Grenander & G. Szegö: Toeplitz Forms and their Applications; University of California Press, Berkely & Los Angeles, 1958", shows how the Carathéodory representation can be numerically calculated, and it also shows that where—for fixed $n \in \{1, \ldots, N\}$—not all K numbers on the right in (6-3) disappear and a certain matrix occurring in the course of the calculations has full rank K, $A_n \in \mathbb{R}^K_+$, and $A_n$ is unambiguously determined, (6-4) solve $\epsilon_n, \epsilon_n' \in \mathbb{Z}^K(6-3)$, thus $\epsilon_n - \epsilon_n' \in \mathbb{Z}^K$, $n \in \{1, \ldots, N\}$, $$\langle \check{\epsilon}_n \rangle \in \left[-\frac{1}{2}, \frac{1}{2}\right[$$

has different components in pairs

Precondition (6-0) and the specification of $\zeta \in \mathbb{R}$ as the maximum of (6-2) guarantee that for each $n \in \{1, \ldots, N\}$ all denominators and at least one numerator of the K numbers on the right in (6-3) are not zero, with the result that a necessary precondition for the validity of (6-4) is fulfilled. Since the rank of said matrix has to be decided for each $n \in \{1, \ldots, N\}$ as a part of the numerical calculation of the Carathéodory representation, it is decided for each $n \in \{1, \ldots, N\}$ whether (6-4) is true or not. If full rank is established for most signals, the other signals can be excluded from the ML estimation or signal processing; otherwise, K can be reduced so that the first case occurs. It is therefore always possible to bring about a situation in which (6-4) is true, which is assumed from now on.

If the maxima (6-2) and the Carathéodory representation (6-3) in the vector or in the matrices $$\zeta := \begin{bmatrix} \zeta^1 \\ \vdots \\ \zeta^N \end{bmatrix} \in \mathbb{R}^N, \tag{6-5}$$

$$\check{E} := \begin{bmatrix} \check{\epsilon}^1_1 & \cdots & \check{\epsilon}^1_N \\ \vdots & & \vdots \\ \check{\epsilon}^K_1 & \cdots & \check{\epsilon}^K_N \end{bmatrix} \stackrel{(6-4)}{\in} \left[-\frac{1}{2}, \frac{1}{2}\right[^{K \times N},$$

$$\check{A} := \begin{bmatrix} \check{A}^1_1 & \cdots & \check{A}^1_N \\ \vdots & & \vdots \\ \check{A}^K_1 & \cdots & \check{A}^K_N \end{bmatrix} \stackrel{(6-4)}{\in} \mathbb{R}^{K \times N}_+$$

are combined, it follows from the above statements that the function $\pounds_K: \mathbb{R}^{K \times N} \times \mathbb{R}^N \times \mathbb{R}^{K \times N} \to \mathbb{R}_+$ defined according to $$\pounds_K(\Delta, \varsigma, A) \stackrel{(6\text{-}1)}{:=} \sum_{n=1}^N \pounds_K^n(\Delta(:,n), \varsigma^n, A(:,n)), \quad (6\text{-}6)$$

$$\Delta, A \in I\!R^{K \times N}, \varsigma \in I\!R^N,$$

assumes its maximum for any integral matrix $E \in I\!R^{K \times N}$ and any desired permutation matrices $J_n \in \{0,1\}^{K \times K}$, $n \in \{2, \ldots, N\}$, in $$\left( \begin{bmatrix} \frac{E+\check{E}}{\lambda^1}(:,1), J_2^T \cdot \\ \frac{E+\check{E}}{\lambda^2}(:,2), \ldots, J_N^T \cdot \\ \frac{E+\check{E}}{\lambda^N}(:,N) \end{bmatrix}, \check\varsigma, \begin{bmatrix} \check{A}(:,1), J_2^T \cdot \\ \check{A}(:,2), \ldots, J_N^T \cdot \\ \check{A}(:,N) \end{bmatrix} \right). \quad (6\text{-}7)$$

Since by definition $$\pounds_{K,K}(\delta, \varsigma, A) \stackrel{\substack{(6\text{-}1)\\(6\text{-}6)}}{=} \pounds_K(\delta \cdot 1_N^T, \varsigma, A), \delta \in I\!R^K, \varsigma \in I\!R^N, A \in I\!R^{K \times N}, \quad \substack{(4\text{-}5)\\(6\text{-}8)}$$

is true, maximisation of $\pounds_{K,K}$ is therefore equivalent to minimisation of the difference $$\pounds_K\left( \begin{bmatrix} \frac{E+\check{E}}{\lambda^1}(:,1), \ldots, J_N^T \cdot \\ \frac{E+\check{E}}{\lambda^N}(:,N) \end{bmatrix}, \check\varsigma, \begin{bmatrix} \check{A}(:,1), \ldots, J_N^T \cdot \\ \check{A}(:,N) \end{bmatrix} \right) - \quad (6\text{-}9)$$

$$\pounds_K(\delta \cdot 1_N^T, \varsigma, A)$$

for $(\delta, \varsigma, A) \in I\!R^K \times I\!R^N \times I\!R^{K \times N}$ and for any desired matrices $E \in I\!R^{K \times N}$ and permutation matrices $J_n \in \{0,1\}^{K \times K}$, $n \in \{2, \ldots, N\}$.

The function $\pounds_K: I\!R^{K \times N} \times I\!R^N \times I\!R^{K \times N} \rightarrow \mathbb{Z}$ defined according to (6-6) can be differentiated as often as desired, and its first two derivatives $$\pounds_K'(\Delta, \varsigma, A) := \frac{\partial \pounds_K}{\partial \begin{bmatrix} \Delta(:) \\ \varsigma \\ A(:) \end{bmatrix}}(\Delta, \varsigma, A) \in I\!R^{1 \times (2 \cdot K + 1) \cdot N} \quad \& \quad (6\text{-}10)$$

$$\pounds_K''(\Delta, \varsigma, A) := \frac{\partial [\pounds_K']^T}{\partial \begin{bmatrix} \Delta(:) \\ \varsigma \\ A(:) \end{bmatrix}}(\Delta, \varsigma, A) \in I\!R^{(2 \cdot K + 1) \cdot N \times (2 \cdot K + 1) \cdot N}$$

can be calculated analytically. Known propositions of the mathematical analysis state that $\pounds_K'$ or the so-called Hesse matrix $\pounds_K''$ evaluated at the maxima (6-7) vanishes or is symmetrical or negatively semidefinite; in addition, $\pounds_K''$ at the maxima (6-7) is independent of $E \in \mathbb{Z}^{K \times N}$. If the function on the right in (6-9) is replaced by its second-order Taylor series around the maximum of $\pounds_K$ on the left in (6-9), the following quadratic approximation of the difference (6-9) to be minimised results:

$$\begin{bmatrix} J \cdot [\lambda \otimes \delta] - [E + \check{E}](:) \\ \varsigma - \check\varsigma \\ J \cdot A(:) - \check{A}(:) \end{bmatrix}^T \cdot L \cdot \begin{bmatrix} J \cdot [\lambda \otimes \delta] - [E + \check{E}](:) \\ \varsigma - \check\varsigma \\ J \cdot A(:) - \check{A}(:) \end{bmatrix}, \text{with} \quad (6\text{-}11)$$

$$L := \begin{bmatrix} L_{11} & L_{21}^T \\ L_{21} & L_{22} \end{bmatrix} := \frac{-1}{2} \cdot \operatorname{Diag}\left( \begin{bmatrix} \lambda \otimes 1_K \\ 1_{N+K \cdot N} \end{bmatrix} \right)^{-1} \cdot \quad (6\text{-}12)$$

$$\pounds_K''(\check{E} \div [1_K \cdot \lambda^T], \check\varsigma, \check{A}) \cdot \operatorname{Diag}\left( \begin{bmatrix} \lambda \otimes 1_K \\ 1_{N+K \cdot N} \end{bmatrix} \right)^{-1}$$

$$(L_{11} \in I\!R^{K \cdot N \times K \cdot N}, L_{21} \in I\!R^{(N+K \cdot N) \times K \cdot N}, L_{22} \in I\!R^{(N+K \cdot N) \times (N+K \cdot N)})$$

and the block diagonal matrix $$J := \begin{bmatrix} I_K & 0_{K \times K} & \cdots & 0_{K \times K} \\ 0_{K \times K} & J_2 & & \vdots \\ \vdots & & \ddots & 0_{K \times K} \\ 0_{K \times K} & \cdots & 0_{K \times K} & J_N \end{bmatrix} \in \{0,1\}^{K \cdot N \times K \cdot N}, \quad (6\text{-}13)$$

with permutation matrices $J_n \in \{0,1\}^{K \times K}$ in the diagonal, $n \in \{2, \ldots, N\}$. In addition, (6-4) implies the positive definiteness of the matrix $L \in I\!R^{(2 \cdot K + 1) \cdot N \times (2 \cdot K + 1) \cdot N}$ defined according to (6-12). The quadratic function (6-11) is therefore never negative, and a minimum $\hat{E} \in \mathbb{Z}^{K \times N}$, $\hat{J} \in \{0,1\}^{K \cdot N \times K \cdot N}$, $(\hat\delta, \hat\varsigma, \hat{A}) \in I\!R^K \times I\!R^N \times I\!R^{K \times N}$ can thus be calculated from (6-11); $(\hat\delta, \hat\varsigma, \hat{A})$ is then an approximate value for a maximum of the function $\pounds_{K,K}$ defined according to (4-5), and it is chosen as an initial value for the iterative maximisation of $\pounds_{K,L}$.

The introduction of the matrix $E \in \mathbb{Z}^{K \times N}$ into the calculation of the initial value is not surprising: its components configure the integral ambiguities which are also characteristic of single-target phase meters and which have their origin in the inability of the phase meters to measure distances with a single signal; these are obtained only computationally from the interaction of a plurality of measurements with signals of different half-wavelengths. More surprising is the occurrence of the permutation matrix (6-13) which, in the single-target case (K=1), is the identity matrix and therefore does not appear in the case of conventional single-target phase meters. Although it appears because every received signal can be decomposed by means of Carathéodory representation (6-3) according to the targets, the signal components cannot however be unambiguously assigned to the targets; this assignment in turn can only be determined from the interaction of a plurality of measurements with signals of different of half-wavelengths. In order to keep these two different ambiguities apart, the conventional ambiguities configured $E \in \mathbb{Z}^{K \times N}$ are referred to as distance ambiguities while the new ambiguities configured by $J \in \{0,1\}^{K \cdot N \times K \cdot N}$ are referred to as assignment ambiguities. Since the $\hat{A} \in I\!R_{30}^{K \times N}$ given by the Carathéodory representations (6-3) are a measure of the strength of the echoes of the simultaneously surveyed targets, the assignment ambiguity can be resolved by ordering of these amplitudes in cases where these amplitudes differ consistently and strongly from one another. If this is not the case, a minimum of (6-11) can be found by examining all $(K!)^{N-1}$ possible assignments.

The minimisation of the quadratic function (6-11) leads to the following result:

$$\begin{bmatrix} \check{\varsigma} \\ \check{A}(:) \end{bmatrix} = \begin{bmatrix} I_N & 0_{N \times K \cdot N} \\ 0_{K \cdot N \times N} & \hat{J}^T \end{bmatrix} \cdot \qquad (6\text{-}14)$$

$$\left\{ \begin{bmatrix} \check{\varsigma} \\ \check{A}(:) \end{bmatrix} - L_{22}^{-1} \cdot L_{21} \cdot [\hat{J} \cdot [\lambda \otimes \delta] - [\hat{E} + \check{E}](:)] \right\} \in \mathbb{R}^{N+K \cdot N} \text{ and}$$

$$\hat{\delta} = G(\hat{J})^+ \cdot R \cdot [\hat{E} + \check{E}](:) \in \mathbb{R}^K, \qquad (6\text{-}15)$$

where $R \in \mathbb{R}^{K \cdot N \times K \cdot N}$ is the right Cholesky factor of the Schur complement of $L_{22} \in \mathbb{R}^{(N+K \cdot N) \times (N+K \cdot N)}$ in $L \in \mathbb{R}^{(2 \cdot K+1) \cdot N \times (2 \cdot K+1) \cdot N}$ which inherits the positive definiteness of L, i.e.

(6-16)

$R^T \cdot R = L_{11} - L_{21}^T \cdot L_{22}^{-1} \cdot L_{21}$, $R \in \mathbb{R}^{K \cdot N \times K \cdot N}$ is a right triangle with diag$(R) \in \mathbb{R}^{K \cdot N}$, and (6-17)

$G(J) := R \cdot J \cdot [\lambda \otimes I_K] \in \mathbb{R}^{K \cdot N \times K}$ with $J \in \{0,1\}^{K \cdot N \times K \cdot N}$ according to (6-13); the matrices $\hat{E} \in \mathbb{Z}^{K \times N}$ and $\hat{J} \in \{0,1\}^{K \cdot N \times K \cdot N}$ occurring in (6-14) and (6-15) are the minima of the square of the vector norm (6-18)

$\|P_{G(J)}^\perp \cdot R \cdot [E+E](:)\|_2^2$, $E \in \mathbb{Z}^{K \times N}$ and $J \in \{0,1\}^{K \cdot N \times K \cdot N}$ according to (6-13).

Owing to the integrality requirement $E \in \mathbb{Z}^{K \times N}$, the minimisation of (6-18)—for every choice of $J \in \{0,1\}^{K \cdot N \times K \cdot N}$ according to (6-13)—is the so-called integral quadratic fit problem. The manner in which it can be solved efficiently according to the invention is described below.

Integral ambiguities occur in many technical systems; the most well known example is GPS [Global Positioning System]. An efficient method for solving integral quadratic fit problems, the so-called LAMBDA method [Least Squares Ambiguity Decorrelation Algorithm], therefore also originates from this application; it is described, for example in §8 of the book "P. J. G. Teunissen & A. Kleusberg (Eds.): GPS for Geodesy, $2^{nd}$ Edition; Springer, Berlin, 1998" and in the article "P. de Jonge & C. Tiberius: The LAMBDA Method for Integer Ambiguity Estimation: Implementation Aspects; LGR-Series, Publications of the Delft Geodetic Computing Centre, TU Delft, January 1996".

A precondition for the applicability of the LAMBDA method or of a related method is that the coefficient matrix of the fit problem must have full rank. However, it is precisely this which is not fulfilled in the case of (6-18): in fact, (6-17), (6-16), (6-13) and (1-2) result in (7-0) Rank$(G(J))=K$, $J \in \{0,1\}^{K \cdot N \times K \cdot N}$ according to (6-13), and hence $$\text{Rank}(P_{G(J)}^\perp \cdot R) \stackrel{(6\text{-}16)}{=} \text{Rank}(P_{G(J)}^\perp) \stackrel{(7\text{-}0)}{=} K \cdot (N-1),$$
$$J \in \{0,1\}^{K \cdot N \times K \cdot N} \text{ according to (6-13);} \qquad (7\text{-}1)$$

the coefficient matrix $P_{G(J)}^\perp \cdot R \in \mathbb{R}^{K \cdot N \times K \cdot N}$ in (6-18) therefore has rank defect K.

Efficient methods for solving integral quadratic fit problems are therefore not directly applicable to (6-18), and the method described for calculating the initial value is suitable in practice only when the rank defect in (6-18) can be efficiently eliminated. A method which performs this is described below.

The starting point of this method is to choose the half-wavelengths (1-0) so that they have rational ratios to one another, i.e. so that $$\lambda \in \mathbb{Q}^N \left( \stackrel{(1\text{-}2)}{\underset{(1\text{-}0)}{\Longrightarrow}} \lambda = \frac{p}{p^1} \text{ with} \right. \qquad (7\text{-}2)$$

$$\left. p := \begin{bmatrix} p^1 \\ \vdots \\ p^N \end{bmatrix} \in \mathbb{N}^N \ \& \ p^1 < p^2 < \ldots < p^N \ \& \ ggT(p) = 1 \right)$$

where $ggT(p) \in \mathbb{N}$ designates the greatest common devisor of the components of $p \in \mathbb{N}^N$.

A further part of the method is the choice of a unimodular supplement of $p \in \mathbb{N}^N$ i.e. a matrix $P' \in \mathbb{Z}^{N \times (N-1)}$ such that $$P := [P', p] \in Z_N \text{ and consequently} \qquad (7\text{-}3)$$

$$Q := P^{-1} = \begin{bmatrix} Q' \\ q^T \end{bmatrix} \in Z_N, \quad \begin{matrix} Q' \in \mathbb{Z}^{(N-1) \times N} \\ q \in \mathbb{Z}^N \end{matrix}$$

In (7-3) $Z_N := \{Z \in \mathbb{Z}^{N \times N} \| \det(Z) | = 1\} \subset \mathbb{Z}^{N \times N}$ designates the set of the so-called unimodular N×N matrices which is a group with respect to the matrix multiplication; its elements are the automorphisms of $\mathbb{Z}^N$. (7-3) results in particular in $$q^T \cdot p \stackrel{(7\text{-}3)}{=} 1 \stackrel{(7\text{-}2)}{=} ggT(p);$$

$q \in \mathbb{Z}^N$ is therefore a so-called ggT coefficient vector for $p \in \mathbb{N}^N$, i.e. ggT(p) can be written as a linear combination of the components of $p \in \mathbb{N}^N$ with coefficients from $q \in \mathbb{Z}^N$. A set of the elementary number theory guarantees the existence of unimodular supplements (for N>2, there is even an infinite number) of vectors $p \in \mathbb{N}^N$ of the form (7-2), and numerical number theory provides algorithms which calculate these efficiently. For example, algorithm 3 in the article "G. Havas, B. S. Majewski & K. R. Matthews: Extended GCD and Hermite Normal Form Algorithms via Lattice Basis Reduction; Experimental Mathematics 7:2 (1998), pages 125-136", corrected in "G. Havas, B. S. Majewski & K. R. Matthews: Extended GCD and Hermite Normal Form Algorithms via Lattice Basis Reduction (addenda and errata); Experimental Mathematics 8:2 (1999), page 205", which calculates, for $p \in \mathbb{N}^N$, a matrix $Q \in Z_N$ which fulfils (7-3) and has elements of small magnitude, can be modified so that, instead of Q, it generates its inverse P=[P',p] or both together.

A further part of the method is the transformation of variables $$\begin{bmatrix} -e' \\ e'' \end{bmatrix} := [Q \otimes I_K] \cdot J^T \cdot E(:) \stackrel{(7\text{-}3)}{\underset{(6\text{-}13)}{\in}} \mathbb{Z}^{K \cdot N}, \qquad (7\text{-}4)$$

$e' \in \mathbb{Z}^{K \cdot (N-1)}$ $e'' \in \mathbb{Z}^K$ , $E \in \mathbb{Z}^{K \times N}$, in $\mathbb{Z}^{K \cdot N}$; the following are applicable for it:

$$E(:) \overset{(7-4)}{\underset{(7-3)}{=}} J \cdot [P \otimes I_K] \cdot \begin{bmatrix} -e' \\ e'' \end{bmatrix} \overset{(7-3)}{\underset{(7-4)}{=}} J \cdot \{p \otimes e'' - [P' \otimes I_K] \cdot e'\} \overset{(7-4)}{=} \quad (7-5)$$
$$\overset{(6-13)}{}$$
$$J \cdot \{[p \otimes I_K] \cdot e'' - [P' \otimes I_K] \cdot e'\} \overset{(7-2)}{=}$$
$$J \cdot \{[\lambda \otimes I_K] \cdot (p^1 \cdot e'') - [P' \otimes I_K] \cdot e'\} \text{ and}$$

$$P^\perp_{G(J)} \cdot R \cdot J \cdot [p \otimes I_K] \overset{(7-2)}{=} \quad (7-6)$$
$$p^1 \cdot P^\perp_{G(J)} \cdot R \cdot J \cdot [\lambda \otimes I_K] \overset{(6-17)}{=} p^1 \cdot P^\perp_{G(J)} \cdot G(J) = 0_{K \cdot N \times K}.$$

(7-5) and (7-6) result in $$\left\| P^\perp_{G(J)} \cdot R \cdot [E + \check{E}](:)\right\|^2_2 \overset{(7-5)}{\underset{(7-6)}{=}} \left\| P^\perp_{G(J)} \cdot R \cdot [J \cdot [P' \otimes I_K] \cdot e' - \check{E}(:)]\right\|^2_2, \quad (7-7)$$

and (7-6), (6-13), (7-3) and (7-1) result in $$\text{Rank}(P^\perp_{G(J)} \cdot R \cdot [P' \otimes I_K]) \overset{(7-6)}{=} \quad (7-8)$$
$$\text{Rank}(P^\perp_{G(J)} \cdot R \cdot ([P', p] \otimes I_K)) \overset{(6-13)}{\underset{(7-3)}{=}}$$
$$\text{Rank}(P^\perp_{G(J)} \cdot R) \overset{(7-1)}{=} K \cdot (N-1).$$

The square of the vector norm on the right in (7-7) therefore has a coefficient matrix of full rank, and its minimum $\hat{e}'(J) \in \mathbb{Z}^{K \cdot (N-1)}$ can be efficiently calculated for any $J \in \{0,1\}^{K \cdot N \times K \cdot N}$, for example by means of the LAMBDA method or a related method. If necessary, the integral quadratic fit problem (7-7) is solved for each of the permutation matrices (6-13); the smallest of these $(K!)^{N-1}$ minima then specifies the minimum $(\hat{J}, \hat{e}'(\hat{J})) \in \{0,1\}^{K \cdot N \times K \cdot N} \times \mathbb{Z}^{K \cdot (N-1)}$, from which $\hat{E} \in \mathbb{Z}^{K \times N}$ is calculated according to (7-5), where $e'' \in \mathbb{Z}^K$ can be arbitrarily chosen. This gives $$\hat{\delta} \overset{(6-15)}{\underset{(7-5)}{=}} \quad (7-9)$$
$$G(\hat{J})^+ \cdot R \cdot \{\hat{J} \cdot [\lambda \otimes I_K] \cdot (p^1 \cdot e'') - \hat{J} \cdot [P' \otimes I_K] \cdot \hat{e}' + \check{E}(:)\} \overset{(6-17)}{=}$$
$$G(\hat{J})^+ \cdot G(\hat{J}) \cdot (p^1 \cdot e'') + G(\hat{J})^+ \cdot R \cdot \{\check{E}(:) - \hat{J} \cdot [P' \otimes I_K] \cdot \hat{e}'\} \overset{(7-0)}{=}$$
$$G(\hat{J})^+ \cdot R \cdot \{\check{E}(:) - \hat{J} \cdot [P' \otimes I_K] \cdot \hat{e}'\} + p^1 \cdot e'' \in$$
$$\mathbb{R}^K, e'' \in \mathbb{Z}^K, \text{ and}$$

$$\hat{J} \cdot [\lambda \otimes \hat{\delta}] - [\hat{E} + \check{E}](:) \overset{(7-9)}{\underset{(7-5)}{=}} \quad (7-10)$$
$$\hat{J} \cdot \{\lambda \otimes [G(\hat{J})^+ \cdot R \cdot \{\check{E}(:) - \hat{J} \cdot [P' \otimes I_K] \cdot \hat{e}'\}]\} +$$
$$\hat{J} \cdot [P' \otimes I_K] \cdot \hat{e}' - \check{E}(:) = [I_{K \cdot N} - \hat{J} \cdot [\lambda \otimes (G(\hat{J})^+ \cdot R)]] \cdot$$
$$\{\hat{J} \cdot [P' \otimes I_K] \cdot \hat{e}' - \check{E}(:)\} \in \mathbb{R}^{K \cdot N}.$$

Equation (7-9) illustrates the $p^1$-periodicity of the initial value $\hat{\delta} \in \mathbb{R}^K$, which is a consequence of the $p^1$-periodicity of the function £$_{K,K}$ defined according to (4-5) in the case of (7-2). The limits of the range (4-3) for (1-22) should therefore be chosen so that $$\delta^+ - \delta^- \leq p^1 \text{ or } d^+ - d^- \leq p^1 \quad (7-11)$$

is true, which unambiguously specifies $e'' \in \mathbb{Z}^K$ in (7-9). Equation (7-10) shows that the initial values $(\hat{\zeta}, \hat{A}) \in \mathbb{R}^N \times \mathbb{R}^{K \times N}$ calculated according to (6-14) are not dependent on the limits of the range (7-11).

The above-described calculation of the initial value requires a considerable computational effort, and it is desirable to have available a simpler method, which at most is only of limited applicability. Such a method is described below In order to justify the method, the ideal case of noise-free received signals is considered: if $$W = O_{M \times N} = W_\pm \quad (8-0)$$

is set, the distance and calibration signal data $S, S_\pm \in \mathbb{R}^{M \times N}$ are unambiguously specified by the "true values", postulated by the model, of the parameters according to (1-6) and (1-21) which occur in the signal model. If these "true values" of $\delta \in [\delta^- \cdot 1_K, \delta^+ \cdot 1_K], \zeta \in \mathbb{R}^N$ and $A \in \mathbb{R}^{K \times N}$ are designated with $\overline{\delta}, \overline{\zeta}$, and $\overline{A}$, an analysis of the analytical reduction of the minimisation of (2-0) to the maximisation of (4-5) shows that (8-0) implies the identities $$\frac{r^l_n}{r^l_{-n}} \cdot e^{2 \cdot \pi \cdot i \cdot (\psi^l_{-n} + l \cdot \beta'' \cdot \overline{\zeta}'')} = \overline{A}(:, n)^T \cdot e^{2 \cdot \pi \cdot i \cdot l \cdot \lambda'' \cdot \overline{\delta}} \quad (8-1)$$
$$= \frac{r^l_n}{r^l_{+n}} \cdot e^{2 \cdot \pi \cdot i \cdot (\psi^l_{+n} - l \overline{\zeta}'')}, \quad \begin{matrix} 1 \leq l \leq L \\ 1 \leq n \leq N \end{matrix},$$

and from this it follows, owing to (4-1) that $(\overline{\delta}, \overline{\zeta}, \overline{A})$ is the maximum of the function £$_{K,L}$ defined according to (4-5). The following is therefore true:

$$W = O_{M \times N} = W_\pm \Rightarrow (\hat{\delta}, \hat{\zeta}, \hat{A}) = (\overline{\delta}, \overline{\zeta}, \overline{A}),$$

which corresponds to behaviour which is expected by any respectable estimator.

Because $K \leq L$, $$\check{A}(:, n)^T \cdot e^{2 \cdot \pi \cdot i \cdot k \cdot \check{\varepsilon}_n} \overset{(6-3)}{\underset{(8-1)}{=}} \overline{A}(:, n)^T \cdot e^{2 \cdot \pi \cdot i \cdot k \cdot \lambda'' \cdot \overline{\delta}}, \quad \begin{matrix} 1 \leq k \leq K \\ 1 \leq n \leq N \end{matrix}, \quad (8-3)$$
$$\overset{(4-1)}{}$$

Also follows from (6-3), (8-1) and (4-1) and, because of (6-4), $$\langle \lambda^n \cdot \overline{\delta} \rangle \overset{(8-3)}{\underset{(6-4)}{=}} \overline{J}^T_n \cdot \check{E}(:, n) \text{ \& } \overline{A}(:, n) \overset{(8-3)}{\underset{(6-4)}{=}} \overline{J}^T_n \cdot \check{A}(:, n), \quad (8-4)$$
$$1 \leq n \leq N,$$

follows therefrom for suitably chosen permutation matrices $\overline{J}_n \in \{0,1\}^{K \times K}, 1 \leq n \leq N$, and likewise $$\cos(2 \cdot \pi \cdot [\psi^k_{+n} - \psi^k_{-n} - k \cdot (1 + \beta^n) \cdot \overline{\zeta}^n]) \overset{(8-1)}{=} 1, \quad \begin{matrix} 1 \leq k \leq K \\ 1 \leq n \leq N \end{matrix}, \quad (8-5)$$

which, because of the choice of $\zeta^n \in \mathbb{R}$ as the maximum with the smallest magnitude of the function (6-2) for $n \in \{1, \ldots, N\}$, implies $$\hat{\zeta} = \overline{\zeta}. \quad (8-6)$$

The identities (8-4) indicate that, with suitably chosen numbering of the targets, there are according to (6-13) matrices $\hat{E} \in \mathbb{Z}^{K \times N}$ and $\overline{J} \in \{0,1\}^{K \cdot N \times K \cdot N}$, for which $$[\bar{E} + \check{E}](:) \stackrel{(8-4)}{\underset{(6-13)}{=}} \bar{J} \cdot [\lambda \otimes \bar{\delta}] \in \mathbb{R}^{K \cdot N} \& \qquad (8\text{-}7)$$

$$\check{A}(:) \stackrel{(8-4)}{\underset{(6-13)}{=}} \bar{J} \cdot \bar{A}(:) \in \mathbb{R}^{K \cdot N}$$

is true. This implies $$P_{G(\bar{J})}^{\perp} \cdot R \cdot [\bar{E} + \check{E}](:) \stackrel{(8\text{-}7)}{=} P_{G(\bar{J})}^{\perp} \cdot R \cdot \bar{J} \cdot [\lambda \otimes \bar{\delta}] = \qquad (8\text{-}8)$$

$$P_{G(\bar{J})}^{\perp} \cdot R \cdot \bar{J} \cdot [\lambda \otimes I_K] \cdot \bar{\delta} \stackrel{(6\text{-}17)}{=} P_{G(\bar{J})}^{\perp} \cdot G(\bar{J}) \cdot \bar{\delta} = O_{K \cdot N},$$

i.e. (6-18) or (7-7) can be set to zero, which shows that the minimisation of the square of the vector norm (7-7) for noise-free signals also gives the "true parameter values" $\bar{\delta} \in \mathbb{R}^K$, $\bar{\zeta} \in \mathbb{R}^N$, $\bar{A} \in \mathbb{R}^{K \times N}$. Also true is $$\frac{1}{p^1} \cdot \bar{\delta} \stackrel{(7\text{-}3)}{=} \qquad (8.9)$$

$$\frac{q^T \cdot p}{p^1} \bar{\delta} \stackrel{(7\text{-}2)}{=} (q^T \cdot \lambda) \cdot \bar{\delta} = [q^T \otimes I_K] \cdot [\lambda \otimes \bar{\delta}] \stackrel{(8\text{-}7)}{\underset{(6\text{-}13)}{=}} [q^T \otimes I_K] \cdot$$

$$\bar{J}^T \cdot [\bar{E} + \check{E}](:) \stackrel{(7\text{-}5)}{\underset{(6\text{-}13)}{=}} [q^T \otimes I_K] \cdot \{p \otimes \bar{e}'' - [P' \otimes I_K] \cdot \bar{e}' +$$

$$\bar{J}^T \cdot \check{E}(:)\} = (q^T \cdot p) \cdot \bar{e}'' - [(q^T \cdot P') \otimes I_K] \cdot$$

$$\bar{J}^T \cdot \check{E}(:) \stackrel{(7\text{-}3)}{=} \bar{e}'' + [q^T \otimes I_K] \cdot \bar{J}^T \cdot \check{E}(:),$$

which, because $p^1 \in \mathbb{N}$, is equivalent to $$\bar{\delta} = p^1 \cdot \left\{ \sum_{n=1}^{N} q^n \cdot \bar{J}_n^T \cdot \check{E}(:,n) + \bar{e}'' \right\} \cdot \bar{e}'' \in \mathbb{Z}^K. \qquad (8\text{-}10)$$

The above statements show that, in the ideal case of noise-free signals, the estimated ML value $(\hat{\delta}, \hat{\zeta}, \hat{A})$ can be calculated via maximisations of the functions (6-2), via Carathéodory representations (6-3) and via formula (8-10), provided that it is possible to learn the estimated ML value $\hat{J} \in \{0,1\}^{K \cdot N \times K \cdot N}$ for the assignment ambiguity. As already noted, this is trivial in the case K=1, and targets with substantially different echo strengths are easily possible in the case of K>1; otherwise, it is possible to attempt to determine $\hat{J} \in \{0,1\}^{K \cdot N \times K \cdot N}$ from formula (8-10), which is applied to many ggT coefficient vectors $q \in \mathbb{Z}^N$ of $p \in \mathbb{N}^N$.

The simplified calculation of the initial value now consists in applying the method just described to the real noise-containing distance and calibration signal data $S, S_{\pm} \in \mathbb{R}^{M \times N}$. The minimisation of (7-7) is thus replaced by the simpler calculation of ggT coefficient vectors $q \in \mathbb{Z}^N$ for $p \in \mathbb{N}^N$, which preferably have components of small magnitude, and which are used in formula (8-10). The justification of this simplified method makes it advisable to use it only in situations of low-noise received signals.

BRIEF DESCRIPTION OF THE DRAWINGS

The multi-targeting method according to the invention for measuring distance according to the phase measuring principle is explained in more detail below, purely by way of example, with reference to working examples shown schematically in the drawing. Specifically.

DETAILED DESCRIPTION OF THE DRAWINGS

Figure 1:
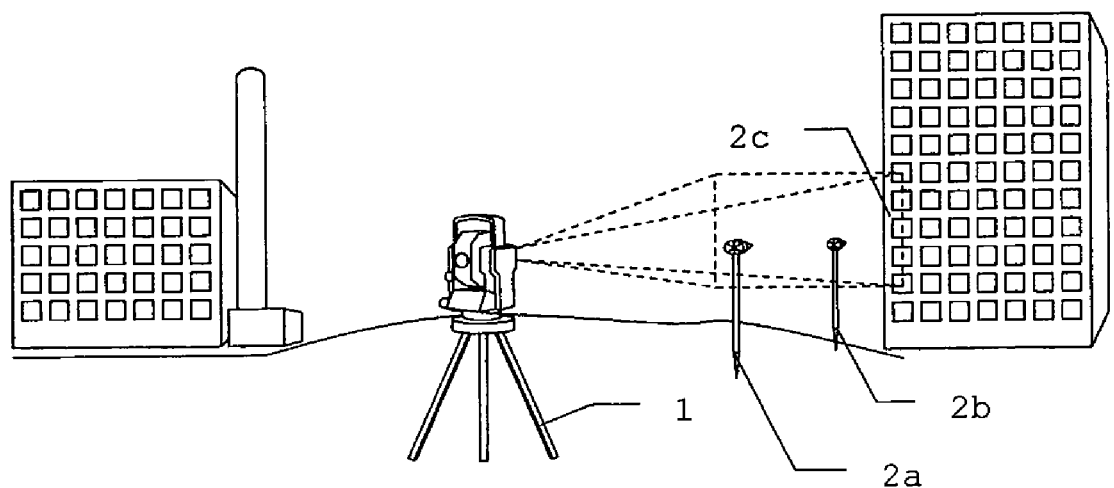
FIG. 1 shows the schematic diagram of a distance measurement for the multi-target case.

FIG. 1 schematically shows the conditions for a distance measurement in the multi-target case. A signal is emitted by a transmitter in a geodetic device 1, which is represented here by way of example as a total station, and is reflected by a plurality of targets, which are embodied here by way of example by reflectors as first target object 2a and second target object 2b, the reflection being detected by a receiver in the device 1. The components of the two target objects 2a and 2b overlap in the receiver so that the latter records only a single signal having a phase which has components of both individual phases. In the example shown, components of a reflection by the house wall 2c shown in the background may also occur under certain circumstances, which components likewise contribute to the received signal. For the sake of clarity, only two cooperative target objects 2a and 2b to be surveyed are shown in the figures. The method according to the invention for measuring distance can, however, be used both for other types of targets and for larger numbers of target objects.

Figure 2:
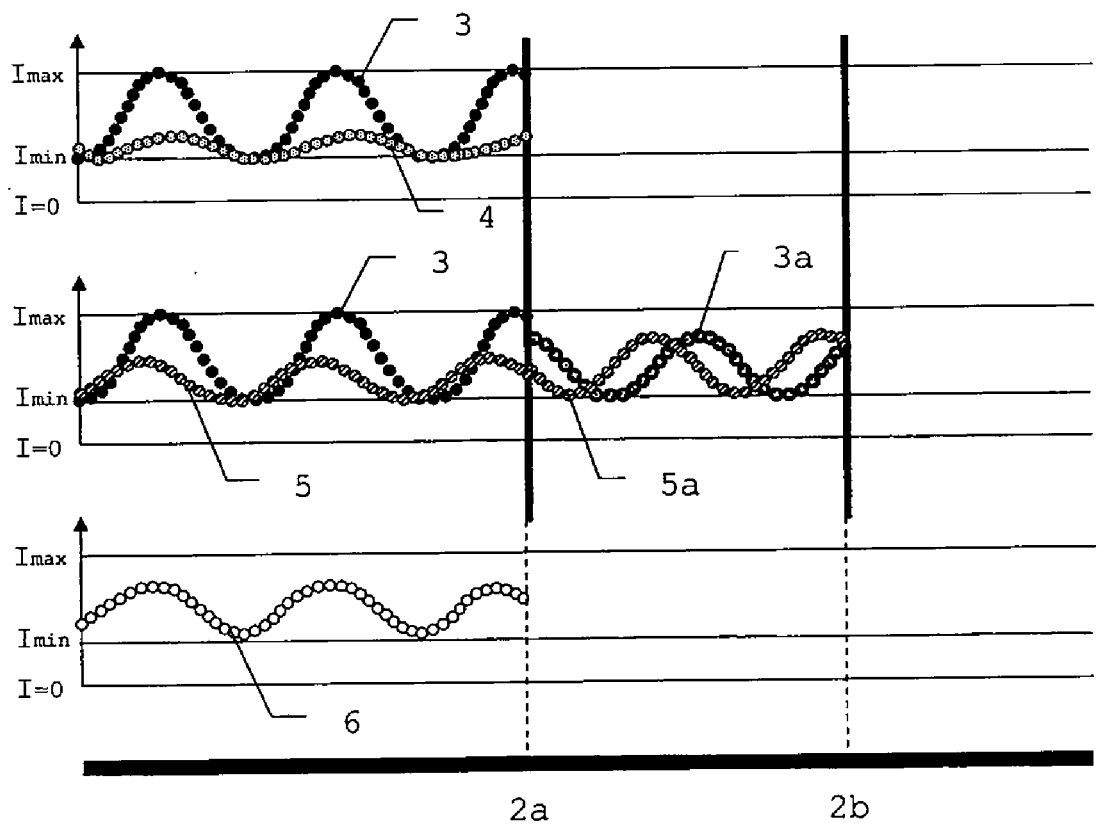
FIG. 2 shows the schematic diagram of the phases for the multi-target case.

FIG. 2 shows a schematic diagram of the phases for this multi-target case with two target objects 2a and 2b. The uppermost diagram shows how emitted radiation 3 strikes a reflector as the first target object 2a, by which a first radiation component 4 is reflected back. As shown in the middle diagram, the remaining part of the emitted radiation 3, for example after transmission through a transparent target or obscuration in the case of the first target object 2a shown, strikes, as a second radiation component 3a, the second target object 2b, which is shown here as an identical reflector. The third radiation component 5a reflected back by the second target object 2b finally strikes the receiver again as fourth radiation component 5, optionally after a further obscuration by the first target object 2a. However, said receiver always registers, as signal 6 to be received, the superposed first and fourth radiation components 4 and 5 with a common multi-target phase, i.e. the reflections of both target objects 2a and 2b are registered together and without separation.

Figure 3:
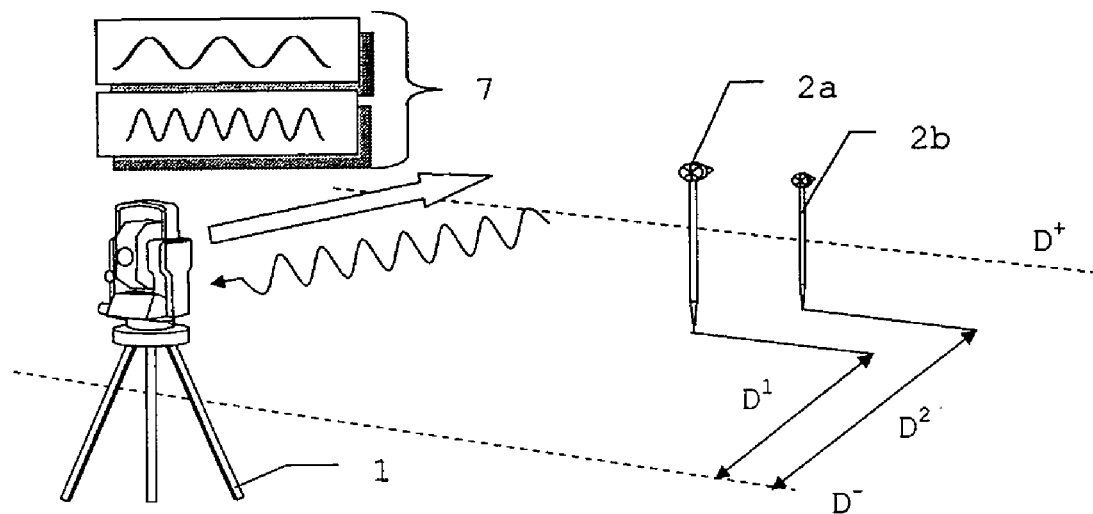
FIG. 3 shows the schematic diagram of the basic principle of the method according to the invention for measuring distance and FIG. 4 shows the schematic diagram of the phases for the decomposition of the individual target phases with the use of the second harmonic.

FIG. 3 illustrates the schematic diagram of the basic principle of the method according to the invention for measuring distance. In this example, N=2 periodic, electromagnetic signals 7, e.g. laserlight, having the two half-wavelengths $\Lambda^1 > \Lambda^2 > 0$ are emitted at separate times by the device 1. The reflections by the K=2 target objects 2a and 2b at the distances $D^1, D^2$ are sampled as received signals at equitemporal sampling times for generating and optionally storing sampled values, the sampling being effected $M \geq 2K$ times per signal period, i.e. $M \geq 2$ in the single-target case and $M \geq 4$ in the example with 2 targets which is present here. The distances $D^1, D^2$ are in the measuring range of the rangefinder in the device 1, which measuring range is defined by the specified distances $D^- \in \mathbb{R}$ and $D^+ \in \mathbb{R}$ with $D^- < D^+$. From the sampled values, the distances $D^1, D^2$ to the K=2 targets are determined simultaneously exclusively by the phase measuring principle. Here, a statistical parameter estimation problem based on a mathematical signal model is solved so that the inequalities $D^-\leq D^1, D^2<D^+$ are true. The number of target objects $2a$ and $2b$ can either be determined on determination of the distances from the sampled values or can be specified as known.

Figure 4:
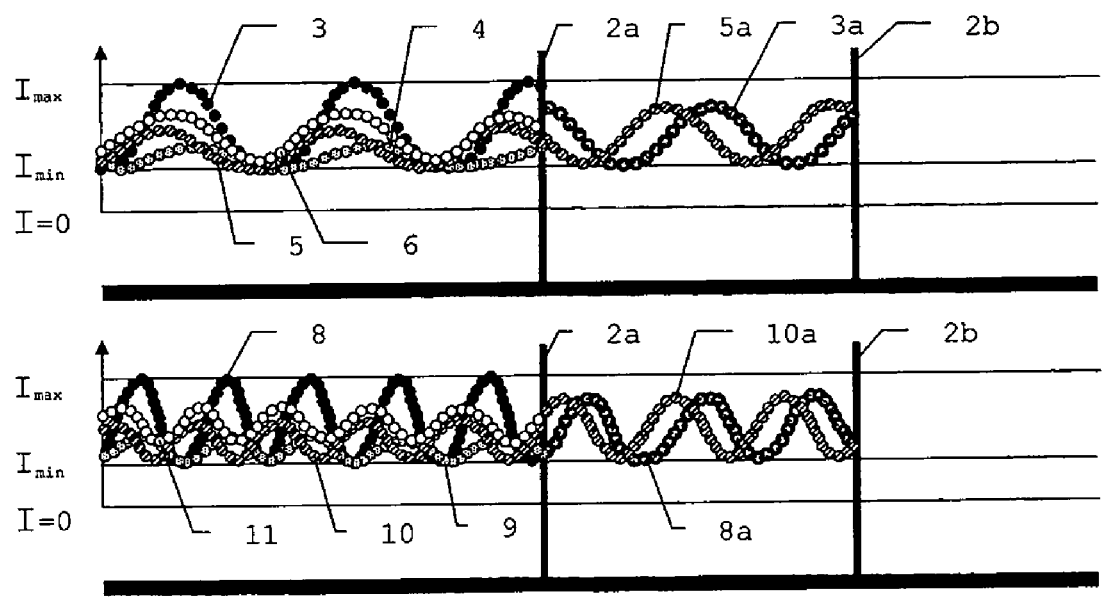

An unambiguous decomposition of the reflected radiation or of the received signals is possible if higher harmonic components are also taken into account in the signal reception and signal evaluation. FIG. 4 schematically shows the phases for the multi-target case with use of the second harmonic as the lowest higher harmonic in relation to FIG. 2. For radiation 8 emitted with double frequency in accordance with the second harmonic, similar conditions are now applicable. The higher harmonic radiation 8 likewise strikes the first target object $2a$, from which a first higher harmonic radiation component 9 is reflected back. The remaining part reaches the second target object $2b$ as the second higher harmonic radiation component $8a$. The third higher harmonic radiation component $10a$ reflected back from the second target object $2b$ finally strikes the receiver again as fourth higher harmonic radiation component 10, optionally after a further obscuration by the first target object $2a$. Said receiver likewise registers the superposed first and fourth higher harmonic radiation components 9 and 10 with a common higher harmonic multi-target phase 11.

I claim:

1. A method for measuring distance, comprising:
   transmitting $N\geq 2$ periodic signals having half-wavelengths $\Lambda^1 > \ldots > \Lambda^N > 0$, at separate times;
   sampling received signals at equitemporal sampling times for generating and storing sampled values, the received signals of K targets having reflected and superposed signal components and sampling being effected $M\geq 2$ times per signal period; and
   simultaneously determining distances $D^1, \ldots, D^K \in R$ to the K targets from the sampled values exclusively by a phase measuring principle, wherein on determination of the distances, the number K of targets is specified in the case of a known number $K\geq 2$ of targets or determined from the sampled values in the case of an unknown number of targets and a statistical parameter estimation problem based on a mathematical signal model is solved so that the inequalities $D^-\leq D^k<D^+$ are true for $1\leq k\leq K$, wherein specified distances $D^-\in R$ and $D^+\in R$ with $D^-<D^+$ establish the measuring range of a rangefinder.

2. A method for measuring distance according to claim 1, wherein:
   each of the periodic signals contains at least $L\in N$ non-vanishing harmonic components with the lowest frequency; and
   an upper bound $\overline{K}\in N$ of the target distances which are to be determined simultaneously, the number L and the number $M\in N$ of equitemporal signal samplings are chosen so that the inequality $$\overline{K} \leq L < \frac{M}{2}$$

is fulfilled.

3. A method for measuring distance according to claim 1, wherein a signal model links distance signal data $s_n^m \in R$ from the sampled values to the unknown target distances according to the M·N equations:

$$s_n^m = a^n + \sum_{k=1}^K A_n^k \cdot \sum_n \left( \frac{D^k}{\Lambda^n} + y^n + \frac{m-1}{M} \right) + w_n^m, \; 1\leq m \leq M, \; 1\leq n \leq N,$$

which is capable of being combined in a matrix equation $$S = 1_M \cdot a^T + \sum_{k=1}^K [1_m \cdot A(k,:)] \cdot \sum (1_M \cdot [d^k \cdot \lambda + y]^T + x \cdot 1_N^T) + $$

$$W \text{ with } S := \begin{bmatrix} s_1^1 & \cdots & s_N^1 \\ \vdots & \ddots & \vdots \\ s_1^M & \cdots & s_N^M \end{bmatrix} \in R^{M\times N},$$

$$1_M := \begin{bmatrix} 1 \\ \vdots \\ 1 \end{bmatrix} \in N^M$$

designating a vector with M components 1, direct current components $a^n \in R$ of the distance signal data $s_n^m$ being combined in the vector $$a := \begin{bmatrix} a^1 \\ \vdots \\ a^N \end{bmatrix} \in R^N,$$

a superscript T indicating a transposition of vectors or matrices characterised therewith, $A(k,:)\in R^{1\times N}$ designating the k th row vector of a matrix $$A := \begin{bmatrix} A_1^1 & \cdots & A_N^1 \\ \vdots & \ddots & \vdots \\ A_1^K & \cdots & A_N^K \end{bmatrix} \in R_+^{K\times N}$$

whose element $A_n^k \in R_+$ designates a component, referred to as target amplitude, of the n th signal reflected by the k th target, a symbol $\circ$ designating the Hadamard or element-wise multiplication of the matrices to the left and right of it, $$\sum(X) := \begin{bmatrix} \sum_1 (X_1^1) & \cdots & \sum_N (X_N^1) \\ \vdots & \ddots & \vdots \\ \sum_1 (X_1^M) & \cdots & \sum_N (X_N^M) \end{bmatrix} \in R^{M\times N}$$

designating a matrix of the signal shapes evaluated at the points $$X := \begin{bmatrix} X_1^1 & \cdots & X_N^1 \\ \vdots & \ddots & \vdots \\ X_1^M & \cdots & X_N^M \end{bmatrix} \in \mathbb{R}^{M \times N},$$

an n th signal shape $\Sigma_n$ being modelled as a periodic function $\Sigma_n: \mathbb{R} \to \mathbb{R}$ which can be doubly continuously differentiated and has a period 1,
a vector $$d = \begin{bmatrix} d_1 \\ \vdots \\ d^K \end{bmatrix} := \frac{1}{\Lambda^1} \cdot \begin{bmatrix} D^1 \\ \vdots \\ D^K \end{bmatrix} \in \mathbb{R}^K$$

containing target distances $d^1, \ldots, d^K$ measured in multiples of the half-wavelength $\Lambda^1 \in \mathbb{R}_+$,
a vector $$\lambda = \begin{bmatrix} \lambda^1 \\ \vdots \\ \lambda^N \end{bmatrix} := \begin{bmatrix} 1 \\ \Lambda^1/\Lambda^2 \\ \vdots \\ \Lambda^1/\Lambda^N \end{bmatrix} \in \mathbb{R}_+^N$$

containing reciprocal values $1 = \lambda^1 < \ldots < \lambda^N$ of the half-wavelengths of the signals, measured in multiples of the half-wavelength $\Lambda^1 \in \mathbb{R}_+$,
phase positions $y^n$ of the measuring signals being combined in a vector $$y := \begin{bmatrix} y^1 \\ \vdots \\ y^N \end{bmatrix} \in \left[-\frac{1}{2}, \frac{1}{2}\right[^N,$$

a vector $$x := \frac{1}{M} \cdot \begin{bmatrix} 0 \\ 1 \\ \vdots \\ M-1 \end{bmatrix} \in [0, 1[^M$$

containing the equitemporal sampling times, and $$W := \begin{bmatrix} w_1^1 & \cdots & w_N^1 \\ \vdots & \ddots & \vdots \\ w_1^M & \cdots & w_N^M \end{bmatrix} \in \mathbb{R}^{M \times N}$$

designating a matrix of those noise components of the distance signal data $s_n^m$ which are modelled as mean value-free random variables $w_n^m \in \mathbb{R}$.

4. A method for measuring distance according to claim 3, wherein the signal model models the covariance matrices $C^{(n)}, C_-^{(n)}, C_+^{(n)} \in \mathbb{R}^{M \times M}$ of the random matrices $W, W_-,$ $W_+ \in \mathbb{R}^{M \times M}$ as symmetrical positively definite circulant matrices and configures them according to:

$$C^{(n)} = F_M^H \cdot [\text{Diag}(\sigma_n)]^2 \cdot F_M, \sigma_n = \begin{bmatrix} \sigma_n^0 \\ \vdots \\ \sigma_n^{M-1} \end{bmatrix} \in \mathbb{R}_+^M$$

$$C_\pm^{(n)} = F_M^H \cdot [\text{Diag}(\sigma_{\pm n})]^2 \cdot F_M, \sigma_{\pm n} = \begin{bmatrix} \sigma_{\pm n}^0 \\ \vdots \\ \sigma_{\pm n}^{M-1} \end{bmatrix} \in \mathbb{R}_+^M$$

and $\sigma_n^m = \sigma_n^{M-m}$, $\sigma_{\pm n}^m = \sigma_{\pm n}^{M-m}$, $F_M \in \mathbb{C}^{M \times M}$ designating a discrete Fourier transformation in $\mathbb{C}^M$, the matrix with the elements $$[F_M]_{m'}^m := \frac{1}{\sqrt{M}} \cdot e^{-2\pi i \cdot \frac{(m-1) \cdot (m'-1)}{M}}$$

$$= \frac{1}{\sqrt{M}} \cdot e^{2\pi i \cdot \frac{(m-1) \cdot (M+1-m')}{M}} \in \mathbb{C},$$

$1 \leq m, m' \leq M$.

5. A method for measuring distance according to claim 3, wherein the target amplitudes $A \in \mathbb{R}_+^{K \times N}$ satisfy one of the conditions:

Rank(A)=1 or $A = A(:,1) \cdot 1_N^T \in \mathbb{R}_+^{K \times N}$

Rank (A) designating the rank and $A(:,1) \in \mathbb{R}^N$ designating the first column vector of the matrix A.

6. A method for measuring distance according to claim 1, wherein, for calibration, at least one of the N periodic signals:
is passed at least once over a reference distance within the device;
is equitemporally sampled M times per signal period; and
is used for determining the distances $D^1, \ldots, D^K$ and $d^1, \ldots, d^K$.

7. A method for measuring distance according to claim 6, wherein the signal model models the covariance matrices $C^{(n)}, C_-^{(n)}, C_+^{(n)} \in \mathbb{R}^{M \times M}$ of the random matrices $W, W_-,$ $W_+ \in \mathbb{R}^{M \times M}$ as symmetrical positively definite circulant matrices and configures them according to:

$$C^{(n)} = F_M^H \cdot [\text{Diag}(\sigma_n)]^2 \cdot F_M, \sigma_n = \begin{bmatrix} \sigma_n^0 \\ \vdots \\ \sigma_n^{M-1} \end{bmatrix} \in \mathbb{R}_+^M$$

$$C_\pm^{(n)} = F_M^H \cdot [\text{Diag}(\sigma_{\pm n})]^2 \cdot F_M, \sigma_{\pm n} = \begin{bmatrix} \sigma_{\pm n}^0 \\ \vdots \\ \sigma_{\pm n}^{M-1} \end{bmatrix} \in \mathbb{R}_+^M$$

and $\sigma_n^m = \sigma_n^{M-m}$ $\sigma_{\pm n}^m = \sigma_{\pm n}^{M-m}$, $F_M \in \mathbb{C}^{M \times M}$ designating a discrete Fourier transformation in $\mathbb{C}^M$, the matrix with the elements $$[F_M]_{m'}^m := \frac{1}{\sqrt{M}} \cdot e^{-2\pi i \cdot \frac{(m-1)(m'-1)}{M}}$$

$$= \frac{1}{\sqrt{M}} \cdot e^{2\pi i \cdot \frac{(m-1)(M+1-m')}{M}} \in \mathbb{C},$$

$1 \leq m, m' \leq M$.

8. A method for measuring distance according to claim 6, wherein, for calibration, at least one of the N periodic signals is passed at twice over a reference distance within the device.

9. A method for measuring distances according to claim 6, wherein the signal model describes:

precalibration signal data $s_{-n}^m \in \mathbb{R}$; and postcalibration signal data $s_{+n}^m \in \mathbb{R}$ from the sampled values of two measurements performed at separate times by the matrix equations:

$$S_\pm = 1_M \cdot a_\pm^T + \Sigma(1_{M'}[d^0 \cdot \lambda + y - \alpha_\pm \circ \eta]^T + x \cdot 1_N^T) + W_\pm,$$

a subscript_ characterising the precalibration signal data and a subscript_+ characterising the postcalibration signal data, the calibration signal data $s_{\pm n}^m \in \mathbb{R}$ being combined in the matrix $$S_\pm := \begin{bmatrix} s_{\pm 1}^1 & \cdots & s_{\pm N}^1 \\ \vdots & \ddots & \vdots \\ s_{\pm 1}^M & \cdots & s_{\pm N}^M \end{bmatrix} \in \mathbb{R}^{M \times N},$$

direct current components $a_\pm^n \in \mathbb{R}$ of the calibration signal data being combined in a vector $$a_\pm := \begin{bmatrix} a_\pm^1 \\ \vdots \\ a_\pm^N \end{bmatrix} \in \mathbb{R}^N,$$

$$d^0 := \frac{D^0}{\Lambda^1} \in \mathbb{R}$$

designating a distance $D^0 \in \mathbb{R}$ described in multiples of the half-wavelength $\Lambda^1 \in \mathbb{R}_+$ and defined by the reference distance within the device, vectors $\alpha_\pm \in \mathbb{R}^N$ describing the observable component of the phase drift behaviour of the receiver, a vector $\eta \in \mathbb{R}^N$ describing the non-observable component of the phase drift behaviour of the receiver, and $$W_\pm := \begin{bmatrix} w_{\pm 1}^1 & \cdots & w_{\pm N}^1 \\ \vdots & \ddots & \vdots \\ w_{\pm 1}^M & \cdots & w_{\pm N}^M \end{bmatrix} \in \mathbb{R}^{M \times N}$$

designating the matrix of those noise components of the calibration signal data $s_{\pm n}^m$ which are modelled as mean-value free random variables $w_{\pm n}^m \in \mathbb{R}$.

10. A method for measuring distance according to claim 9, wherein the signal model models the covariance matrices $C^{(n)}, C_-^{(n)}, C_+^{(n)} \in \mathbb{R}^{M \times M}$ of the random matrices $W, W_-,$ $W_+ \in \mathbb{R}^{M \times M}$ as symmetrical positively definite circulant matrices and configures them according to:

$$C^{(n)} = F_M^H \cdot [\text{Diag}(\sigma_n)]^2 \cdot F_M, \sigma_n = \begin{bmatrix} \sigma_n^0 \\ \vdots \\ \sigma_n^{M-1} \end{bmatrix} \in \mathbb{R}_+^M$$

$$C_\pm^{(n)} = F_M^H \cdot [\text{Diag}(\sigma_{\pm n})]^2 \cdot F_M, \sigma_{\pm n} = \begin{bmatrix} \sigma_{\pm n}^0 \\ \vdots \\ \sigma_{\pm n}^{M-1} \end{bmatrix} \in \mathbb{R}_+^M$$

and $$\sigma_n^m = \sigma_n^{M-m}$$

$$\sigma_{\pm n}^m = \sigma_{\pm n}^{M-m},$$

$F_M \in \mathbb{C}^{M \times M}$ designating a discrete Fourier transformation in $\mathbb{C}^M$, the matrix with the elements $$[F_M]_{m'}^m := \frac{1}{\sqrt{M}} \cdot e^{-2\pi i \cdot \frac{(m-1)(m'-1)}{M}}$$

$$= \frac{1}{\sqrt{M}} \cdot e^{2\pi i \cdot \frac{(m-1)(M+1-m')}{M}} \in \mathbb{C},$$

$1 \leq m, m' \leq M$.

11. A method for measuring distance according to claim 10, wherein variables according to:

$$[F_M \cdot S]_n^{1+l} = \sqrt{M} \cdot r_n^l \cdot e^{2\pi i \cdot \varphi_n^l} \text{ mit } \begin{array}{l} 1 \leq l \leq L \\ \end{array}$$

$$r_n^l \in \overline{\mathbb{R}_+} \;\&\; \varphi_n^l \in \left[-\frac{1}{2}, \frac{1}{2}\right], \quad 1 \leq n \leq N,$$

$$[F_M \cdot S_\pm]_n^{1+l} = \sqrt{M} \cdot r_{\pm n}^l \cdot e^{2\pi i \cdot \varphi_{\pm n}^l} \text{ mit } \begin{array}{l} 1 \leq l \leq L \\ \end{array}$$

$$r_{\pm n}^l \in \overline{\mathbb{R}_+} \;\&\; \varphi_{\pm n}^l \in \left[-\frac{1}{2}, \frac{1}{2}\right], \quad 1 \leq n \leq N,$$

$Q, Q_\pm, Q' \in \mathbb{R}_+^{L \times N}$ with the elements:

$$Q_n^l := \frac{r_n^l}{\sigma_n^l}, \; Q_{\pm n}^l := \frac{r_{\pm n}^l \cdot \sigma_n^l}{[\sigma_{\pm n}^l]^2},$$

$$Q_n^{\prime l} := \frac{\sigma_n^l \cdot \sqrt{[\sigma_{-n}^l]^2 + [\sigma_{+n}^l]^2}}{\sigma_{-n}^l \cdot \sigma_{+n}^l}, \quad \begin{array}{l} 1 \leq l \leq L \\ 1 \leq n \leq N \end{array},$$

$$\Psi_\pm = \begin{bmatrix} \psi_{\pm 1}^1 & \cdots & \psi_{\pm N}^1 \\ \vdots & \ddots & \vdots \\ \psi_{\pm 1}^L & \cdots & \psi_{\pm N}^L \end{bmatrix}$$

$$:= \begin{bmatrix} \varphi_1^1 & \cdots & \varphi_N^1 \\ \vdots & \ddots & \vdots \\ \varphi_1^L & \cdots & \varphi_N^L \end{bmatrix} - \begin{bmatrix} \varphi_{\pm 1}^1 & \cdots & \varphi_{\pm N}^1 \\ \vdots & \ddots & \vdots \\ \varphi_{\pm 1}^L & \cdots & \varphi_{\pm N}^L \end{bmatrix} \epsilon]-1, 1[^{L \times N},$$

$$d^- := \frac{D^-}{\Lambda^1} \in \mathbb{R} \text{ and } d^+ := \frac{D^+}{\Lambda^1} \in \mathbb{R},$$

-continued $$\delta := d - d^0 \cdot 1_K \in \mathbb{R}^K \text{ and } \begin{bmatrix} \delta^- \\ \delta^+ \end{bmatrix} := \begin{bmatrix} d^- - d^0 \\ d^+ - d^0 \end{bmatrix} \in \mathbb{R}^2,$$

$$\beta := -\alpha_- \div \alpha_+ \in \mathbb{R}_+^N \text{ and } \varsigma := \alpha_+ \cdot \eta \in \mathbb{R}^N,$$

a symbol $\div$ representing the elementwise division of the matrix on the left of $\div$ by the equidimensional matrix on the right of $\div$, are introduced and the estimated values $\hat{\delta}$, $\hat{\varsigma}$, $\hat{A}$ for unknown target distances $\delta \in [\delta^- \cdot 1_K, \delta^+ \cdot 1_K[$, unknown drift parameters $\varsigma \in \mathbb{R}^N$ and unknown target amplitudes $A \in \mathbb{R}_+^{K \times N}$ are chosen as a maximum $(\hat{\delta}, \hat{\varsigma}, \hat{A})$ of a function $\pounds_{K,L}: \mathbb{R}^K \times \mathbb{R}^N \times \mathbb{R}^{K \times N} \to \mathbb{R}_+$ defined according to:

$$\pounds_{K,L}(\delta, \varsigma, A) := \sum_{n=1}^{N} \sum_{l=1}^{L} \frac{\left| \begin{array}{l} Q_{-n}^l \cdot e^{2 \pi \cdot i \cdot (\psi_{-n}^l + l \cdot \beta^n \cdot \varsigma^n)} + \\ Q_n^l \cdot A(:,n)^T \cdot e^{2 \pi \cdot i \cdot l \cdot \lambda^n \cdot \delta} + \\ Q_{+n}^l \cdot e^{2 \pi \cdot i \cdot (\psi_{+n}^l - l \cdot \varsigma^n)} \end{array} \right|^2}{\left| A(:,n)^T \cdot e^{2 \pi \cdot i \cdot l \cdot \lambda^n \cdot \delta} \right|^2 + [Q_n^l]^2}$$

in the quantity $$B := [\delta^- \cdot 1_K, \delta^+ \cdot 1_K[ \times [\frac{-1}{2} \cdot 1_N \div [1_N + \beta],$$
$$\frac{1}{2} \cdot 1_N \div [1_N + \beta][ \times \overline{\mathbb{R}_+^{K \times N}}. \subset \mathbb{R}^K \times \mathbb{R}^N \times \mathbb{R}^{K \times N}$$

12. A method for measuring distance according to claim 11, wherein the maximum $(\hat{\delta}, \hat{\varsigma}, \hat{A}) \in B$ of the function $\pounds_{K,L}: \mathbb{R}^K \times \mathbb{R}^N \times \mathbb{R}^{K \times N} \to \mathbb{R}_+$ is calculated by means of a locally convergent iterative maximisation method, in particular an approximate value of a maximum of the function $\pounds_{K,K}: \mathbb{R}^K \times \mathbb{R}^N \times \mathbb{R}^{K \times N} \to \mathbb{R}_+$ being used as an initial value $(\hat{\delta}, \hat{\varsigma}, \hat{A}) \in \mathbb{R}^K \times \mathbb{R}^N \times \mathbb{R}^{K \times N}$.

13. A method for measuring distance according to claim 12, wherein the maximisation of the function $\pounds_{K,K}: \mathbb{R}^K \times \mathbb{R}^N \times \mathbb{R}^{K \times N} \to \mathbb{R}_+$ is replaced by the equivalent minimisation of the difference:

$$\pounds_K\left(\left[J_1^T \cdot \frac{E + \breve{E}}{\lambda^1}(:,1), \ldots, J_N^T \cdot \frac{E + \breve{E}}{\lambda^N}(:,N)\right],\right.$$
$$\left. \breve{\varsigma}, \left[\breve{A}(:,1), \ldots, J_N^T \cdot \breve{A}(:,N)\right]\right) - \pounds_K(\delta \cdot 1_N^T, \varsigma, A),$$

the function $\pounds_K: \mathbb{R}^{K \times N} \times \mathbb{R}^N \times \mathbb{R}^{K \times N} \to \mathbb{R}_+$ being defined according to:

$$\pounds_{K,L}(\Delta, \varsigma, A) := \sum_{n=1}^{N} \sum_{k=1}^{K} \frac{\left| \begin{array}{l} Q_{-n}^k \cdot e^{2 \pi \cdot i \cdot (\psi_{-n}^k + k \cdot \beta^n \cdot \varsigma^n)} + \\ Q_n^k \cdot A(:,n)^T \cdot e^{2 \pi \cdot i \cdot k \cdot \lambda^n \cdot \Delta(:,n)} + \\ Q_{+n}^k \cdot e^{2 \pi \cdot i \cdot (\psi_{+n}^k - k \cdot \varsigma^n)} \end{array} \right|^2}{\left| A(:,n)^T \cdot e^{2 \pi \cdot i \cdot k \cdot \lambda^n \cdot \Delta(:,n)} \right|^2 + [Q_n^k]^2},$$

$J_n \in \{0,1\}^{K \times K}$ designating an arbitrary K×K permutation matrix, $E \in \mathbb{Z}^{K \times N}$ designating an arbitrary integral K×N matrix,
a vector $$\breve{\varsigma} := \begin{bmatrix} \breve{\varsigma}^1 \\ \vdots \\ \breve{\varsigma}^N \end{bmatrix} \in \mathbb{R}^N$$

containing the maxima $\breve{\varsigma}^n \in \mathbb{R}$ of the smallest magnitude of the functions $\gamma_n: \mathbb{R} \to \mathbb{R}$ defined according to $$\gamma_n(\varsigma^n) := \sum_{k=1}^{K} \frac{Q_{-n}^k \cdot Q_{+n}^k}{[Q_n^k]^2} \cdot \cos(2 \cdot \pi \cdot [\psi_{+n}^k - \psi_{-n}^k - k \cdot (1 + \beta^n) \cdot \varsigma^n]),$$

$\varsigma^n \in \mathbb{R},$ and
the matrices $$\breve{E} := \begin{bmatrix} \breve{\varepsilon}_1^1 & \cdots & \breve{\varepsilon}_N^1 \\ \vdots & \ddots & \vdots \\ \breve{\varepsilon}_1^K & \cdots & \breve{\varepsilon}_N^K \end{bmatrix} \in \left[-\frac{1}{2}, \frac{1}{2}\right]^{K \times N} \text{ and}$$

$$\breve{A} := \begin{bmatrix} \breve{A}_1^1 & \cdots & \breve{A}_N^1 \\ \vdots & \ddots & \vdots \\ \breve{A}_1^K & \cdots & \breve{A}_N^K \end{bmatrix} \in \overline{\mathbb{R}_+^{K \times N}}$$

being chosen so that they satisfy the K·N equations:

$$\breve{A}(:,n)^T \cdot e^{2 \pi \cdot i \cdot k \cdot \breve{E}(:,n)} = \frac{Q_n^k \cdot [Q_n^k]^2}{Q_{-n}^k \cdot e^{-2 \pi \cdot i \cdot (\psi_{-n}^k + k \cdot \beta^n \cdot \breve{\varsigma}^n)} + Q_{+n}^k \cdot e^{-2 \pi \cdot i \cdot (\psi_{+n}^k - k \cdot \breve{\varsigma}^n)}},$$

$1 \leq k \leq K$
$1 \leq n \leq N$.

14. A method for measuring distance according to claim 13, wherein:

a minimum $\hat{\delta} \in \mathbb{R}^K$, $\hat{\varsigma} \in \mathbb{R}^N$, $\hat{A} \in \mathbb{R}^{K \times N}$, $\hat{E} \in \mathbb{Z}^{K \times N}$ and $\hat{J} \in \{0, 1\}^{K \cdot N \times K \cdot N}$ of the quadratic function $$\begin{bmatrix} J \cdot [\lambda \otimes \delta] - [E + \breve{E}](:) \\ \varsigma - \breve{\varsigma} \\ J \cdot A(:) - \breve{A}(:) \end{bmatrix}^T \cdot L \cdot \begin{bmatrix} J \cdot [\lambda \otimes \delta] - [E + \breve{E}](:) \\ \varsigma - \breve{\varsigma} \\ J \cdot A(:) - \breve{A}(:) \end{bmatrix}$$

approximating that difference is calculated and $(\hat{\delta}, \hat{\varsigma}, \hat{A}) \in \mathbb{R}^K \times \mathbb{R}^N \times \mathbb{R}^{K \times N}$ is used as an initial value for the iterative maximisation of the function $\pounds_{K,L}$;

a symbol $\otimes$ designating the Kronecker product with the vectors or matrices on the left and right of it, $$J := \begin{bmatrix} I_K & O_{K \times K} & \cdots & O_{K \times K} \\ O_{K \times K} & J_2 & & \vdots \\ \vdots & & \ddots & O_{K \times K} \\ O_{K \times K} & \cdots & O_{K \times K} & J_N \end{bmatrix} \in \{0,1\}^{K \cdot N \times K \cdot N}$$

designating the block diagonal matrix with N K×K permutation matrices $J_n \in \{0,1\}^{K \times K}$ in the diagonals, $J_1 := I_K$ being chosen as the identity matrix $I_K \in \{0,1\}^{K \times K}$, $A(:) \in \mathbb{R}^{K \cdot N}$ designating a vector which arises by writing the column vectors of $A \in \mathbb{R}^{K \times N}$ under one another, and a matrix $L \in \mathbb{R}^{(2 \cdot K + 1) \cdot N \times (2 \cdot K + 1) \cdot N}$ being defined according to:

$$L := \begin{bmatrix} L_{11} & L_{21}^T \\ L_{21} & L_{22} \end{bmatrix} :=$$

$$\frac{-1}{2} \cdot Diag\left(\begin{bmatrix} \lambda \otimes 1_K \\ 1_{N+K \cdot N} \end{bmatrix}\right)^{-1} \cdot \mathcal{L}_K''(\check{E} \div [1_K \cdot \lambda^T], \xi, \check{A}) \cdot Diag\left(\begin{bmatrix} \lambda \otimes 1_K \\ 1_{N+K \cdot N} \end{bmatrix}\right)^{-1}$$

with submatrices $L_{11} \in \mathbb{R}^{K \cdot N \times K \cdot N}$, $L_{21} \in \mathbb{R}^{(N+K \cdot N) \times K \cdot N}$ and $L_{22} \in \mathbb{R}^{(N+K \cdot N) \times (N+K \cdot N)}$, $$Diag\left(\begin{bmatrix} \lambda \otimes 1_K \\ 1_{N+K \cdot N} \end{bmatrix}\right) \in \mathbb{R}^{(2 \cdot K + 1) \cdot N \times (2 \cdot K + 1) \cdot N}$$

designating a diagonal matrix with diagonals $$\begin{bmatrix} \lambda \otimes 1_K \\ 1_{N+K \cdot N} \end{bmatrix} \in \mathbb{R}^{(2 \cdot K + 1) \cdot N},$$

and $\mathcal{L}_K'' \in \mathbb{R}^{(2 \cdot K + 1) \cdot N \times (2 \cdot K + 1) \cdot N}$ designating the Hesse matrix of the second derivatives of the function $\mathcal{L}_K : \mathbb{R}^{K \times N} \times \mathbb{R}^N \times \mathbb{R}^{K \times N} \to \mathbb{R}_+$.

15. A method for measuring distance according to claim 14, wherein minimisation of the square of the vector norm $\|P_{G(J)}^{\perp} \cdot R \cdot [E + \check{E}](:)\|_2^2$ for $E \in \mathbb{Z}^{K \times N}$ and $J \in \{0,1\}^{K \cdot N \times K \cdot N}$ is effected.

16. A method for measuring distance according to claim 14, wherein:

the half-wavelengths $\Lambda^1 > \Lambda^2 > \ldots > \Lambda^N > 0$ are chosen in rational ratios;

the vector $\lambda \in \mathbb{R}_+^N$ is represented in the form:

$$\lambda = \frac{p}{p^1} \text{ with } p := \begin{bmatrix} p^1 \\ \vdots \\ p^N \end{bmatrix} \in \mathbb{N}^N \text{ and } ggT(p) = 1;$$

ggT(p) designating the greatest common divisor of the components of $p \in \mathbb{N}^N$, a unimodular matrix $P := [P', p] \in \mathbb{Z}^{N \times N}$ with $P' \in \mathbb{Z}^{N \times (N-1)}$ and last column vector $p \in \mathbb{N}^N$ being chosen, and hence a variable transformation:

$$\begin{bmatrix} -e' \\ e'' \end{bmatrix} := [Q \otimes I_K] \cdot J^T \cdot E(:) \in \mathbb{Z}^{K \cdot N}, \quad \begin{matrix} e' \in \mathbb{Z}^{K \cdot (N-1)} \\ e'' \in \mathbb{Z}^K \end{matrix}, E \in \mathbb{Z}^{K \times N},$$

being carried out in $\mathbb{Z}^{K \cdot N}$, $Q := P^{-1} \in \mathbb{Z}^{K \cdot N}$ designating the inverse of the matrix $P \in \mathbb{Z}^{N \times N}$; and the unimodular matrix $P \in \mathbb{Z}^{N \times N}$ being chosen so that its inverse $Q \in \mathbb{Z}^{N \times N}$ has elements of small magnitude.

17. A method for measuring distance according to claim 16, wherein a minimum $\hat{e}' \in \mathbb{Z}^{K \cdot (N-1)}, \hat{J} \in \{0,1\}^{K \cdot N \times K \cdot N}$ of the square of the vector norm $$\left\| P_{G(J)}^{\perp} \cdot R \cdot [J \cdot [P' \otimes I_K] \cdot e' - \check{E}(:)] \right\|_2^2 \text{ for}$$

$$e' \in \mathbb{Z}^{K \cdot (N-1)} \text{ and } J \in \{0,1\}^{K \cdot N \times K \cdot N}$$

is calculated, $\|\cdot\|_2^2$ designating the square of the Euclidean vector norm $\|\cdot\|_2$, $R \in \mathbb{R}^{K \cdot N \times K \cdot N}$ designating a right Cholesky factor of the matrix $L_{11} - L_{21}^T \cdot L_{22}^{-1} \cdot L_{21} \in \mathbb{R}^{K \cdot N \times K \cdot N}$, and $P_{G(J)}^{\perp} \in \mathbb{R}^{K \cdot N \times K \cdot N}$ designating the normal projection of $\mathbb{R}^{K \cdot N}$ onto its sub space defined by the column vectors of the matrix $G(J) := R \cdot J \cdot [\lambda \oplus I_K] \in \mathbb{R}^{K \cdot N \times K}$; and $$\hat{E}(:) = J \cdot [P \otimes I_K] \cdot \begin{bmatrix} -\hat{e}' \\ e'' \end{bmatrix} \in \mathbb{Z}^{K \cdot N},$$

with any $e'' \in \mathbb{Z}^K$, is calculated from $\hat{e}' \in \mathbb{Z}^{K \cdot (N-1)}$ and $\hat{J} \in \{0,1\}^{K \cdot N \times K \cdot N}$ by variable retransformation.

18. A method for measuring distance according to claim 17, wherein the estimated value $\hat{\delta} \in \mathbb{R}^K$ is calculated according to:

$$\hat{\delta} = p_1 \cdot \left\{ \sum_{n=1}^{N} q^n \cdot \hat{J}_n^T \cdot \hat{E}(:,n) + e'' \right\},$$

with any $e'' \in \mathbb{Z}^K$, $$q := \begin{bmatrix} q^1 \\ \vdots \\ q^N \end{bmatrix} \in \mathbb{Z}^N$$

being chosen so that $q^T \cdot p = 1$.

19. A method for measuring distance according to claim 1, wherein the signals are electromagnetic signals.

20. A computer program product including a program code which is stored on a machine-readable medium, the program code being configured to cause a computer to carry out a method, comprising:

transmitting $N \geq 2$ periodic signals having half-wavelengths $\Lambda^1 > \ldots > \Lambda^N > 0$, at separate times;

sampling received signals at equitemporal sampling times for generating and storing sampled values, the received signals of K targets having reflected and superposed signal components and sampling being effected $M \geq 2$ times per signal period; and simultaneously determining distances $D^1, \ldots, D^K \epsilon \mathbb{R}$ to the K targets from the sampled values exclusively by a phase measuring principle, wherein on determination of the distances, the number K of targets is specified in the case of a known number $K \geq 2$ of targets or determined from the sampled values in the case of an unknown number of targets and a statistical parameter estimation problem based on a mathematical signal model is solved so that the inequalities $D^- \leq D^k < D^+$ are true for $1 \leq k \leq K$, wherein specified distances $D^- \epsilon \mathbb{R}$ and $D^+ \epsilon \mathbb{R}$ with $D^- < D^+$ establish the meeting range of a rangefinder.

* * * * *